(12) United States Patent
Golden

(10) Patent No.: US 7,641,875 B1
(45) Date of Patent: Jan. 5, 2010

(54) MIXED-PHASE CERAMIC OXIDE THREE-WAY CATALYST FORMULATIONS AND METHODS FOR PREPARING THE CATALYSTS

(75) Inventor: Stephen J. Golden, Santa Barbara, CA (US)

(73) Assignee: Catalytic Solutions, Inc., Ventura, CA (US)

( * ) Notice: Subject to any disclaimer, the term of this patent is extended or adjusted under 35 U.S.C. 154(b) by 0 days.

(21) Appl. No.: 12/290,775

(22) Filed: Nov. 3, 2008

Related U.S. Application Data

(63) Continuation of application No. 10/894,892, filed on Jul. 19, 2004, now abandoned, which is a continuation-in-part of application No. 10/127,979, filed on Apr. 22, 2002, now abandoned, which is a continuation-in-part of application No. 09/713,120, filed on Nov. 15, 2000, now abandoned.

(51) Int. Cl.
| | |
|---|---|
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| B01J 23/00 | (2006.01) |

(52) U.S. Cl. .............. 423/213.5; 423/239.1; 423/245.1; 423/247; 502/104; 502/113; 502/302; 502/303; 502/304; 502/306; 502/308; 502/309; 502/311; 502/312; 502/313; 502/314; 502/315; 502/316; 502/317; 502/318; 502/319; 502/320; 502/321; 502/322; 502/323; 502/324; 502/326; 502/327; 502/328; 502/330; 502/331; 502/332; 502/333; 502/334; 502/335; 502/336; 502/337; 502/338; 502/339; 502/341; 502/344; 502/345; 502/346; 502/347; 502/525; 502/527.12

(58) Field of Classification Search .................. 502/104, 502/113, 302, 303, 304, 306, 308, 309, 311, 502/312, 313, 314, 315, 316, 317, 318, 319, 502/320, 321, 322, 323, 324, 326, 327, 328, 502/330, 331, 332, 333, 334, 335, 336, 337, 502/338, 339, 341, 344, 345, 346, 347, 525, 502/527.12; 423/213.5, 239.1, 245.1, 247
See application file for complete search history.

(56) References Cited

U.S. PATENT DOCUMENTS 4,170,573 A * 10/1979 Ernest et al. ................. 502/303

(Continued)

OTHER PUBLICATIONS

Ni et al. "The Atomic Arrangement of bastnäsite-(Ce), Ce(CO$_3$)F, and Structural Elements of synchysite-(Ce), röntgenite-(Ce), and parasite-(Ce)", American Mineralogist, vol. 78, 1993, pp. 415-418.

(Continued)

*Primary Examiner*—Cam N Nguyen
(74) *Attorney, Agent, or Firm*—Reed Smith LLP; Maryellen Hank

(57) ABSTRACT

A multi-phase catalyst for the simultaneous conversion of oxides of nitrogen, carbon monoxide, and hydrocarbons is provided. A catalyst composition comprising the multi-phase catalyst and methods of making the catalyst composition are also provided. The multi-phase catalyst may be represented by the general formula of $Ce_yLn_{1-x}A_{x+s}MO_z$, wherein Ln is a mixture of elements originally in the form of single-phase mixed lanthanides collected from natural ores, a single lanthanide, or a mixture of lanthanides; A is an element selected from a group consisting of Mg, Ca, Sr, Ba, Li, Na, K, Cs, Rb, or any combination thereof; and M is an element selected from the group consisting of Fe, Mn, Cr, Ni, Co, Cu, V, Zr, Pt, Pd, Rh, Ru, Ag, Au, Al, Ga, Mo, W, Ti, or any combination thereof; x is a number defined by $0 \leq x < 1.0$; y is a number defined by $0 \leq y < 10$; s is a number defined by $0 \leq s < 10$; where s=0 only when y>0 and y=0 only when s>0. The multi-phase catalyst can have an overlayer of an oxide having the fluorite structure with a combination of platinum and/or rhodium.

90 Claims, 2 Drawing Sheets

U.S. PATENT DOCUMENTS

| | | | |
|---|---|---|---|
| 4,585,752 A * | 4/1986 | Ernest | 502/304 |
| 4,638,214 A * | 1/1987 | Beers et al. | 313/487 |
| 4,714,694 A * | 12/1987 | Wan et al. | 502/304 |
| 5,057,483 A * | 10/1991 | Wan | 502/304 |
| 5,075,276 A * | 12/1991 | Ozawa et al. | 502/304 |
| 5,128,306 A * | 7/1992 | Dettling et al. | 502/304 |
| 5,364,517 A * | 11/1994 | Dieckmann et al. | 208/121 |
| 5,384,301 A * | 1/1995 | Flytzani-Stephanopoulos et al. | 502/304 |
| 5,393,397 A * | 2/1995 | Fukaya et al. | 204/424 |
| 5,447,705 A * | 9/1995 | Petit et al. | 423/418.2 |
| 5,502,019 A * | 3/1996 | Augustine et al. | 502/314 |
| 5,559,073 A * | 9/1996 | Hu et al. | 502/302 |
| 5,565,181 A * | 10/1996 | Dieckmann et al. | 423/239.1 |
| 5,665,482 A * | 9/1997 | Mori et al. | 429/33 |
| 5,925,590 A * | 7/1999 | White et al. | 502/302 |
| 5,939,354 A | 8/1999 | Golden | |
| 5,977,017 A | 11/1999 | Golden | |
| 6,146,445 A * | 11/2000 | Chen et al. | 95/45 |
| 6,146,549 A * | 11/2000 | Mackay et al. | 252/373 |
| 6,261,989 B1 * | 7/2001 | Tanaka et al. | 502/217 |
| 6,303,098 B1 * | 10/2001 | Kramarz et al. | 423/656 |
| 6,352,955 B1 * | 3/2002 | Golden | 502/302 |
| 6,372,686 B1 * | 4/2002 | Golden | 502/302 |
| 6,458,741 B1 * | 10/2002 | Roark et al. | 502/303 |

OTHER PUBLICATIONS

Fleisher "Relative Proportions of the Lanthanides in Minerals of the Bastnaesite Group" Canadian Mineralogist, vol. 16, 1978, pp. 361-363.

Kilbourn Lanthanides and Yttrium (Raw Materials for Advanced and Engineered Ceramics), Cer. Eng. Sc. Proc., vol. 6, 1985, pp. 1331-1341.

Habashi "The Discovery and Industrialization of the Rare Earths. Part 2", Unocal 76 Molycorp, 1994, pp. 71-76.

Eastwood "Critical Topics in Exhaust Gas Aftertreatment", Chapter 5, Research Studies Press Ltd. Baldock, Hertfordshire, England, 2000, pp. 105-126.

* cited by examiner

MIXED-PHASE CERAMIC OXIDE THREE-WAY CATALYST FORMULATIONS AND METHODS FOR PREPARING THE CATALYSTS

RELATED APPLICATION

This application is a continuation of application Ser. No. 10/894,892, filed Jul. 19, 2004, now abandoned, which is a continuation-in-part of application Ser. No. 10/127,979, filed Apr. 22, 2002, now abandoned, which is a continuation-in-part of application Ser. No. 09/713,120, filed Nov. 15, 2000, now abandoned, which applications are incorporated herein by reference in their entirety. Application Ser. No. 09/713,120 also claimed the benefit under 35 U.S.C. 119(e) of U.S. Provisional Application No. 60/286,186, filed Apr. 23, 2001.

BACKGROUND OF THE INVENTION

1. Field of the Invention

The invention relates generally to three-way catalysts that are able to simultaneously convert nitrogen oxides, carbon monoxide, and hydrocarbons, and specifically to three-way catalyst formulations that contain multi-phase catalysts. The multi-phase catalysts have higher activity than single-phase catalysts with similar compositions. The invention also relates to multi-phase catalysts that additionally contain an oxide layer with precious metal components to increase the activity of the catalyst.

2. Description of the Related Art

Nitrogen oxides, carbon monoxide, and hydrocarbon gases are toxic components in the exhaust gas from internal combustion engines. The simultaneous conversion of the nitrogen oxides, carbon monoxide, and hydrocarbons—"three-way conversion"—is desirable in order to meet emission standards for automobiles and other vehicles. The simultaneous conversion is typically accomplished with catalytic converter units placed downstream from the engine exhaust manifold. In order to achieve an efficient three-way conversion of the toxic components in the exhaust gas, conventional catalytic converter catalysts contain large quantities of precious metals, such as Pd, Pt and Rh, dispersed on suitable oxide carriers in conjunction with other "promoters" on the catalyst. Typically, conventional catalysts use precious metals at concentrations in the range of 30-300 g per cubic foot of catalyst.

Due to the high cost and the limited supply of precious metals, there is a need for a catalyst formulation which efficiently carries out three-way conversion while utilizing precious metals at much lower concentrations than conventional systems. Conventional catalysts with low levels of precious metal generally age more quickly than catalysts with higher levels of precious metal and therefore tend to have short lifetimes. There is a need for three-way catalyst formulations which utilize lower levels of precious metal than conventional catalysts while having a long lifetime.

SUMMARY OF THE INVENTION

It is an object of the present invention to provide an improved three-way catalyst which operates at high efficiencies while requiring a precious metal loading 5-15 times less than the commercial, conventional system.

One aspect of the present invention provides a multi-phase catalyst for the simultaneous conversion of oxides of nitrogen, carbon monoxide, and hydrocarbons. The catalyst is represented by the general formula:

$$Ce_yLn_{1-x}A_{x+s}MO_z,$$

where:

A is an element selected from the group consisting of Mg, Ca, Sr, Ba, Li, Na, K, Cs, Rb, and any combination thereof;

Ln is a mixture of elements originally in the form of single-phase mixed lanthanides collected from natural ores, a single lanthanide, or a mixture of artificial lanthanides;

M is an element selected from the group consisting of Fe, Mn, Cr, Ni, Co, Cu, V, Zr, Pt, Pd, Rh, Ru, Ag, Au, Al, Ga, Mo, W, Ti, and any combination thereof;

x is a number defined by $0 \leq x < 1.0$;
y is a number defined by $0 \leq y < 10$;
s is a number defined by $0 \leq s < 10$; and
z is a number defined by $z > 0$,
where $s=0$ only when $y>0$ and $y=0$ only when $s>0$.

In one embodiment of the present invention, the multi-phase catalyst includes a perovskite phase and a non-perovskite phase. The perovskite phase is represented by the general formula $Ln_{1-x}A_xMO_3$. The non-perovskite phase may be cerium oxide, an alkaline earth oxide represented by a formula AO, an alkali oxide represented by the formula $A_2O$, an alkaline earth carbonate, or any combination thereof.

Another aspect of the present invention provides a catalyst composition. The catalyst composition includes: a substrate; a washcoat; and a multi-phase catalyst represented by the general formula:

$$Ce_yLn_{1-x}A_{x+s}MO_z,$$

where:

Ln is a mixture of elements originally in the form of single-phase mixed lanthanides collected from natural ores, a single lanthanide, or a mixture of artificial lanthanides;

A is an element selected from the group consisting of Mg, Ca, Sr, Ba, Li, Na, K, Cs, Rb, and any combination thereof;

M is an element selected from the group consisting of Fe, Mn, Cr, Ni, Co, Cu, V, Zr, Pt, Pd, Rh, Ru, Ag, Au, Al, Ga, Mo, W, Ti, and any combination thereof;

x is a number defined by $0 \leq x < 1.0$;
y is a number defined by $0 \leq y < 10$;
s is a number defined by $0 \leq s < 10$; and
z is a number defined by $z > 0$,
where $s=0$ only when $y>0$ and $y=0$ only when $s>0$.

In one embodiment of the present invention, the substrate may be a metal or ceramic honeycomb support. The washcoat may include alumina and a cerium oxide-based material. In another embodiment of the present invention, the cerium oxide-based material may be $Ce_{1-a}Zr_aO_{2-\delta1}$ or $Ce_{1-c-d}Zr_cLan_dO_{2-\delta2}$, where:

$0<a<1$;

Lan is at least one rare earth selected from the group consisting of Y, La, Pr, Nd, Sm, Eu, and Yb;
$c > 0.15$;
$0.15 > d > 0.01$; and
$\delta1$ and $\delta2$ are oxygen deficiencies.

In one embodiment of the present invention, the catalyst composition may include at least one precious metal component selected from the group consisting of platinum, rhodium, palladium, iridium, ruthenium, osmium, and silver. In another embodiment of the present invention, the catalyst composition may include at least one base metal. In yet another embodiment of the present invention, the catalyst composition may include a layer containing a cerium oxide-based material with the formula:

$$Ce_{1-c-d}Zr_cLan_dO_{2-\delta2}, \text{where:}$$

Lan is at least one of Y, La, Pr, Nd, Sm, Eu, Gd, Ho, or Yb;
$c > 0.15$;
$0.15 > d > 0.01$; and
$\delta2$ is an oxygen deficiency, where the cerium oxide-based material has the fluorite crystal structure. The layer may also include at least one precious metal component selected from the group consisting of palladium, platinum, and rhodium. In one embodiment of the present invention, the layer includes platinum and rhodium precious metal components. In another embodiment, the layer may include alumina as a non-precious component.

A further aspect of the present invention provides a method of making a catalyst composition. The method includes the steps of:

(a) providing a substrate;
(b) providing at least one carrier material for forming a washcoat on the substrate;
(c) providing a solution for forming a multi-phase catalyst supported by the substrate, where the solution has a general cation formula of $Ce_yLn_{1-x}A_{x+s}M$, where:

Ln is a single lanthanide, a mixture of artificial lanthanides, or a mixture of elements originally in the form of single-phase mixed lanthanides collected from natural ores;

A is an element selected from the group consisting of Mg, Ca, Sr, Ba, Li, Na, K, Cs, Rb, and any combination thereof; and M is an element selected from the group consisting of Fe, Mn, Cr, Ni, Co, Cu, V, Zr, Pt, Pd, Rh, Ru, Ag, Au, Al, Ga, Mo, W, Ti and any combination thereof;

x is a number defined by $0 \leq x < 1.0$;
y is a number defined by $0 \leq y < 10$;
s is a number defined by $0 \leq s < 10$;
where s=0 only when y>0 and y=0 only when s>0;
z is a number defined by z>0;
and (d) forming the catalyst composition including the substrate, the washcoat, and the multi-phase catalyst.

In accordance with one embodiment of the present invention, the catalyst composition may be formed by the steps of:

(a) slurry depositing the carrier material onto the substrate to form a layer of washcoat;
(b) impregnating the solution into the washcoat; and
(c) calcining the substrate, washcoat, and the impregnated solution to form the multi-phase catalyst on the substrate.

In an alternative embodiment of the present invention, the catalyst composition may be formed by the steps of:

(a) forming the multi-phase catalyst in a bulk form from the solution;
(b) forming a slurry suspension of the carrier material and the bulk multi-phase catalyst; and
(c) depositing the slurry suspension onto the substrate to form the multi-phase catalyst on the substrate.

In another embodiment of the present invention, the catalyst composition may be formed by:

(a) impregnating the solution onto the carrier material;
(b) calcining the carrier material impregnated with the solution to form the multi-phase catalyst in the form of a dispersed multi-phase catalyst on the carrier material; and
(c) slurry depositing the carrier material with the dispersed multi-phase catalyst onto the substrate to form the multi-phase catalyst on the substrate.

In an embodiment, the method may also include forming a layer on the catalyst composition, where the layer includes a cerium oxide-based material with the formula:

, where:

Lan is at least one of Y, La, Pr, Nd, Sm, Eu, Gd, Ho, or Yb; c>0.15; 0.15>d>0.01; and
δ2 is an oxygen deficiency.
where the cerium oxide-based material has the fluorite crystal structure In accordance with another aspect of the present invention, a method is provided for the simultaneous conversion of oxides of nitrogen, carbon monoxide, and hydrocarbons in motor vehicle exhaust. The method includes:

(a) providing a catalyst composition, where the catalyst composition includes:
  (a) a substrate;
  (b) a washcoat; and
  (c) a multi-phase catalyst represented by the general formula:

where:
Ln is a mixture of elements originally in the form of single-phase mixed lanthanides collected from natural ores, a single lanthanide, or a mixture of artificial lanthanides;
A is an element selected from the group consisting of Mg, Ca, Sr, Ba, Li, Na, K, Cs, Rb, and any combination thereof;
M is an element selected from the group consisting of Fe, Mn, Cr, Ni, Co, Cu, V, Zr, Pt, Pd, Rh, Ru, Ag, Au, Al, Ga, Mo, W, Ti, and any combination thereof;
x is a number defined by $0 \leq x < 1.0$;
y is a number defined by $0 \leq y < 10$;
s is a number defined by $0 \leq s < 10$; and
z is a number defined by z>0,
where s=0 only when y>0 and y=0 only when s>0;
and (b) contacting the exhaust with the catalyst composition.

In an embodiment, the catalyst composition may also include a layer including a cerium oxide-based material with the formula:

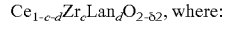

Lan is at least one of Y, La, Pr, Nd, Sm, Eu, Gd, Ho, or Yb;
c>0.15; 0.15>d>0.01; and
δ2 is an oxygen deficiency,
where the cerium oxide-based material has the fluorite crystal structure.

The invention is defined in its fullest scope in the appended claims and is described below in its preferred embodiments.

DETAILED DESCRIPTION OF THE INVENTION

Figure 1:
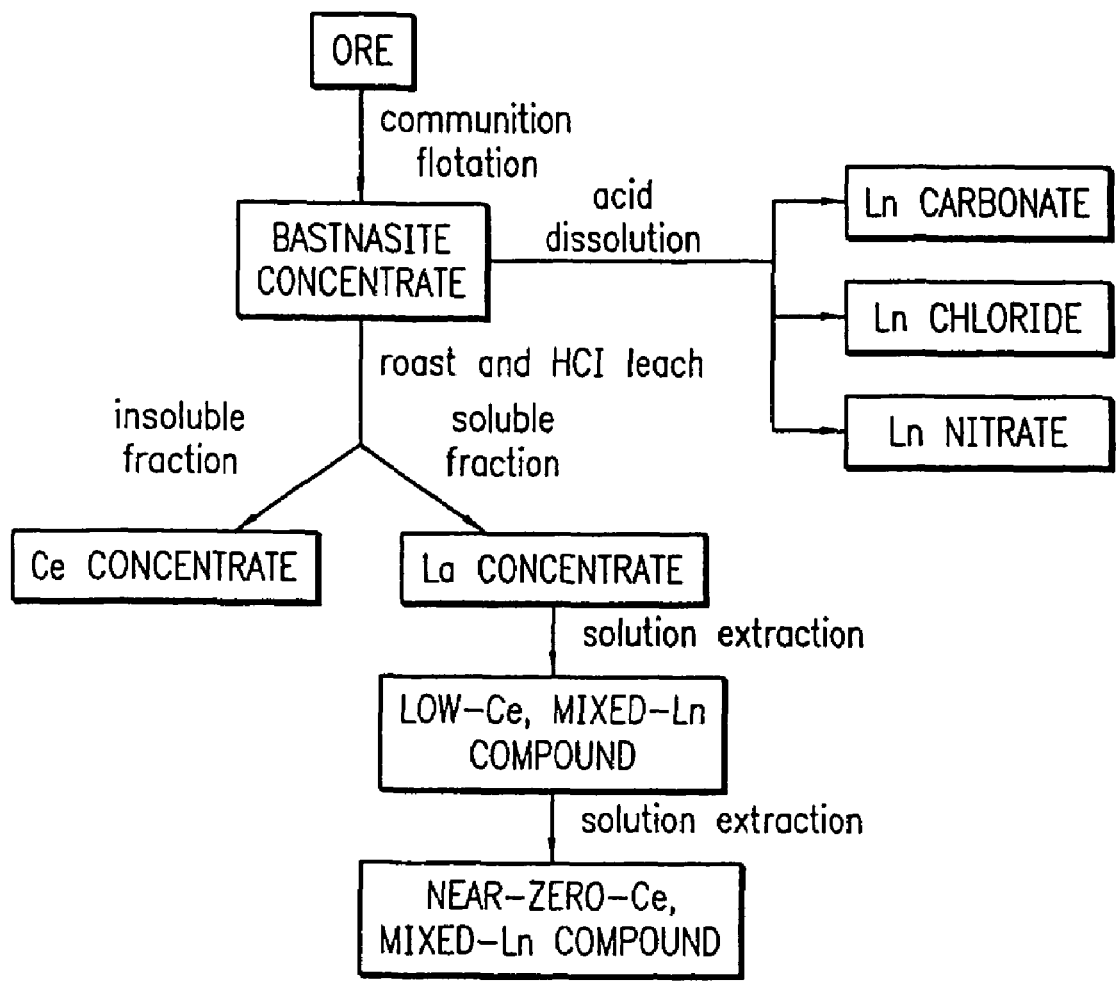
FIG. 1 is a flow chart of a processing route for bastnasite and its mixed lanthanide derivatives.

Multi-phase catalysts are described. The multi-phase catalysts have higher activity than single-phase catalysts with similar compositions. Although not wishing to be limited by a theory, it is believed that forming an intimate mixture of multiple catalyst phases retards the agglomeration or sintering of the multiple phases when the multi-phase catalyst is exposed to high temperatures. The multi-phase catalysts of the embodiments of the present invention may be used to provide simultaneous conversion of nitrogen oxides, carbon monoxide, and hydrocarbons in a catalytic converter. They may also have other applications as described below. The description of the embodiments of multi-phase catalysts as three-way catalysts in automobile catalytic converters is not meant to be limiting.

Accordingly, one aspect of the present invention provides a multi-phase catalyst represented by the general formula:

$Ce_yLn_{1-x}A_{x+s}MO_z$, where

A is an alkali or alkaline earth element selected from the group consisting of Mg, Ca, Sr, Ba, Li, Na, K, Cs, Rb, and any combination thereof;

Ln is a mixture of elements originally in the form of single-phase mixed lanthanides collected from natural ores, a single lanthanide, or a mixture of artificial lanthanides; and M is an element selected from the group consisting of Fe, Mn, Cr, Ni, Co, Cu, V, Zr, Pt, Pd, Rh, Ru, Ag, Au, Al, Ga, Mo, W, Ti, and any combination thereof;

x is a number defined by $0 \leq x < 1.0$;
y is a number defined by $0 \leq y < 10$;
s is a number defined by $0 \leq s < 10$; and
z is a number defined by $z > 0$,
where $y=0$ only when $s>0$.

In accordance with embodiments of the present invention, M may be Fe and/or Mn. The subscript x may be in the range of 0.1 to 0.8 or 0.2 to 0.6. The subscript y may be in the range of 0.2 to 2, 0.2 to 1.5, or 0.4 to 1.2. The subscript s may be in the range of 0.2 to 4, 0.4 to 3, or 0.6 to 2.8. The subscript z depends on the components of the multi-phase catalyst, the oxidation states of the components, and the subscripts x, y, and s. In some instances, the subscript z can be roughly estimated as being approximately $2y-1/2x+s+3$. In accordance with embodiments of the invention, z is in the range of approximately 3 to approximately 33, approximately 3 to approximately 28, approximately 3 to approximately 23, or approximately 3 to approximately 18.

A single-phase mixed lanthanide is a single compound where the cation positions in the compound's crystal structure can be occupied by a variety of lanthanides. Alternatively, the cation positions of the single-phase mixed lanthanide may be occupied by a variety of lanthanides. In an exemplary embodiment of the present invention, the single-phase mixed lanthanide is generated from bastnasite ore. It may contain a number of lanthanide cations and nitrate, carbonate, or chloride anions. The single-phase mixed lanthanide may be a hydrated material, i.e., it may contain waters of hydration. It is known in the art that bastnasite is an ore of a mixed lanthanide fluoride carbonate. The mixed lanthanide fluoride carbonates of bastnasite adopt a crystal structure with discrete layers of [LnF] and [CO$_3$] (Y. Ni et al., *Am. Mineral.*, 78 (1993) 415), where F can be replaced by OH (M. Fleischer, *Can. Mineral.*, 16 (1978) 361). Thus, hydroxyl ions may take up anion positions in the lattice of the monophasic material.

Different lanthanide (Ln) derivatives can be prepared from bastnasite through methods commonly known in the art. Examples of such methods are described in *Cer. Eng. Sc. Proc.* by B. T. Kilbourn, 6 (1985) pp. 1331-1341 and in *The Discovery and Industrialization of the Rare Earths* by Fathi Habashi, UNOCAL 76 MOLYCORP (1994), FIG. 14. Both the Kilbourn reference and the Habashi reference are incorporated herein by reference in their entirety. A typical flow chart relating Ln derivatives obtained from bastnasite ores is shown in FIG. 1. Bastnasite ore is first treated by comminution and flotation to generate bastnasite concentrate. Ln carbonate, Ln chloride, or Ln nitrate may be generated from the bastnasite concentrate through acid dissolution. Alternatively, the bastnasite concentrate may be leached with hydrochloric acid to form soluble and insoluble fractions. Lanthanum concentrate is obtained from the soluble fraction, and cerium concentrate is obtained from the insoluble fraction.

Detailed descriptions of the preparation of single-phase mixed lanthanide derivatives obtained from bastnasite ore are described in U.S. Pat. Nos. 5,939,354 and 5,977,017, both of which are incorporated herein by reference in their entirety.

The mixture of elements originally in the form of single-phase mixed lanthanides may have a natural ratio of lanthanides or a modified ratio of lanthanides. A natural ratio of lanthanides is a ratio identical to or close to the natural distribution ratio in a lanthanide ore. For example, bastnasite ores typically contain, on a lanthanide oxide basis, 4.0% Pr oxide, 50.5% Ce oxide, 33.7% La oxide, and 11.8% Nd oxide. A mixture of lanthanides having the same ratio of lanthanides as the ratio in bastnasite ore would be considered to have a natural ratio of lanthanides. It is to be understood that this ratio may vary owing to inherent variability, not only in the ore body but also in the mineral itself. A mixture with a "modified ratio" of lanthanides contains a ratio of lanthanides that is different than the natural ratio of lanthanides in a lanthanide ore. For the purpose of the present invention, the term "modified ratio" is to be understood to exclude mixtures of purified single lanthanides.

Both bastnasite concentrate and the Ln derivatives generated by acid dissolution of bastnasite concentrate have a natural ratio of lanthanides, because the ratio of lanthanides in these materials is the same as the ratio of lanthanides in bastnasite ore. Both lanthanum concentrate and cerium concentrate have a modified ratio of lanthanides, because the lanthanide ratios in the lanthanum concentrate and the cerium concentrate are different than the lanthanide ratio in bastnasite ore. Lanthanum concentrate is depleted in cerium, and cerium concentrate is enriched in cerium, relative to bastnasite concentrate, which has a natural ratio of lanthanides.

In one embodiment of the present invention, the mixture of lanthanides originally in the form of single-phase mixed lanthanides collected from natural ores is obtained from bastnasite ore. In another embodiment of the present invention, Ln is a mixture of lanthanides derived from lanthanum concentrate, which is obtained from bastnasite ore. In an alternative embodiment of the present invention, Ln is the single lanthanide praseodymium.

The term "mixture of artificial lanthanides," as used herein, is a mixture of purified lanthanides.

In one embodiment of the present invention, the multi-phase catalyst includes a perovskite phase and a non-perovskite phase, where the perovskite phase is represented by the formula $Ln_{1-x}A_xMO_3$. In accordance with embodiments of the present invention, the perovskite phase of the multi-phase catalyst may be represented by a cation formula selected from the group consisting of $Ln_{0.8}Sr_{0.2}Mn_{0.88}Pd_{0.12}$, $Ln_{0.8}Sr_{0.2}Mn_{0.94}Pd_{0.06}$, $Ln_{0.60}Sr_{0.40}Mn_{0.95}Pd_{0.05}$, $Ln_{0.64}Sr_{0.36}Mn_{0.72}Pd_{0.28}$, and $Ln_{0.80}Sr_{0.20}Mn_{0.65}Pd_{0.35}$.

In one embodiment of the present invention, the non-perovskite phase of the multi-phase catalyst is cerium oxide, a doped cerium oxide, an alkali oxide represented by a formula $A_2O$, an alkaline earth oxide represented by a formula AO, an alkaline earth carbonate, an alkali carbonate, or a combination thereof. In one embodiment of the present invention, the alkaline earth oxide AO in the multi-phase catalyst is SrO. Other mixed metal oxide phases may also be present in the multi-phase catalyst.

In accordance with embodiments of the present invention, the multi-phase catalysts may be formed by dissolving water-soluble salts in a single aqueous solution in a ratio represented by the general cation formula $Ce_yLn_{1-x}A_{x+s}M$. As used herein, the water-soluble salts which are dissolved to form the solution with the general cation formula $Ce_yLn_{1-x}A_{x+s}M$ are termed precursor salts. In an embodiment, a homogeneous, amorphous dried solution of the precursor salts is prepared by removing the water from the aqueous solution. The water may be removed through evaporation by heating the solution. Alternatively, the water may be removed by blowing air over the aqueous solution of soluble salts. The dried solution may be calcined to form the multi-phase catalyst. In an embodiment, the solution is dried in a controlled manner to minimize the chance that one or more salts crystallize from the solution of precursor salts. Crystallization of salts from the solution of precursor salts can adversely affect the activity of the catalyst.

In an alternative embodiment, a precipitating agent is added to the aqueous solution of precursor salts to co-precipitate a multi-phase catalyst precursor. The multi-phase catalyst is formed by calcining the multi-phase catalyst precursor. In an embodiment, oxalic acid or an aqueous solution of oxalic acid is used as the precipitating agent. Other precipitating agents, such as citric acid, are suitable for forming the multi-phase catalyst precursor from the aqueous solution by co-precipitation. In an embodiment, a stream containing an aqueous solution of the precursor salts is mixed with a stream of an aqueous solution of oxalic acid to form the multi-phase catalyst precursor. In another embodiment, the multi-phase catalyst precursor is dried before the precursor is calcined to form the multi-phase catalyst.

Any manner of soluble salts may be used to form the solution. Suitable soluble salts include, but are not limited to, nitrates, acetates, oxalates, hydroxides, oxides, carbonates, etc. In one embodiment of the present invention, an acid such as malic acid, is added to the aqueous solution of soluble salts to stabilize the solution by preventing or minimizing precipitation of salts. If malic acid is used, approximately 9-10 wt % malic acid is generally added to the aqueous solution.

The multi-phase catalyst is formed from the dried solution of soluble salts or the multi-phase catalyst precursor by heating the dried solution or the multi-phase catalyst precursor to a temperature sufficiently high to form the desired phase chemistry of the multi-phase catalyst. Although the temperature that is sufficiently high depends on the multi-phase catalyst that is being formed, in one embodiment of the present invention, where A is Sr and M is Mn, the homogeneous dried solution or multi-phase precursor is generally heated to a temperature of approximately 500° C. to approximately 1000° C. In accordance with other embodiments of the present invention, the dried solution or multi-phase precursor is heated to a temperature of approximately 600° C. to approximately 900° C. or a temperature of approximately 700° C. to approximately 850° C. to form the multi-phase catalyst. The temperature ranges for forming the multi-phase catalyst will depend on the cation formula and the particular cations used. It is to be understood that the temperature that is sufficiently high may be higher or lower than the ranges for the embodiment where A is Sr and M is Mn for some embodiments of multi-phase catalysts.

In accordance with embodiments of the present invention, the dried solution or multi-phase catalyst precursor is heated for approximately 1 to approximately 100 hours, approximately 2 to approximately 50 hours, or approximately 3 to approximately 10 hours to form the multi-phase catalyst, although the time will vary, depending on the formulation of the multi-phase catalyst Suitable conditions for forming the multi-phase catalyst may be determined by one skilled in the art without undue experimentation in view of the teaching herein.

In an exemplary embodiment of the present invention, the cation solution or the multi-phase catalyst precursor is dried in flowing air at room temperature, is heat-treated in air at about 150° C., and is calcined at about 700° C. for about 10 hours to form the multi-phase catalyst with the general formula of $Ce_yLn_{1-x}A_{x+s}MO_z$.

Although not wishing to be limited by a theory, it is believed that, when the multi-phase catalyst is formed by calcining the homogeneous dried solution, an intimate mixture of the two or more phases of the multi-phase catalyst is formed. It is believed that the intimate mixture of the multiple phases of the multi-phase catalyst retards the agglomeration or sintering of the multiple phases when the multi-phase catalyst is exposed to high temperatures.

The embodiments of the multi-phase catalyst of the present invention may be used to make a catalyst composition. Accordingly, another aspect of the present invention provides a catalyst composition that includes:

(a) a substrate;

(b) a washcoat; and (c) a multi-phase catalyst represented by the general formula:

$$Ce_yLn_{1-x}A_{x+s}MO_z.$$

The composition of the multi-phase catalyst has been described previously.

As used herein, a substrate is any support structure known in the art for supporting catalysts. In one embodiment of the present invention, the substrate is in the form of beads or pellets. The beads or pellets may be formed from alumina, silica alumina, silica, titania, mixtures thereof, or any suitable material. In an exemplary embodiment of the present invention, the substrate is a honeycomb support. The honeycomb support may be a ceramic honeycomb support or a metal honeycomb support. The ceramic honeycomb support may be formed, for example, from sillimanite, zirconia, petalite, spodumene, magnesium silicates, mullite, alumina, mullite, cordierite ($Mg_2Al_4Si_5O_{18}$), other alumino-silicate materials, or combinations thereof. Other ceramic supports are also suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, all of the substrate supports, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 60 to about 1200 or more gas inlet openings or passages per square inch of cross section, although fewer passages may be used.

A washcoat may be placed on the substrate. The term "washcoat," as used herein, refers to a coating of oxide solids on the substrate or solid support structure. The oxide solids in the washcoat may be carrier material oxides, one or more catalyst oxides, or a mixture of carrier material oxides and catalyst oxides. Carrier materials are porous solid oxides that are used to provide a high surface area for a dispersed phase.

Carrier materials are normally stable at high temperatures and under a range of reducing and oxidizing conditions.

Preferably, the carrier materials are initially in a powder form. The carrier material may be an inert powder or any other carrier materials that are known in the art for forming a washcoat on a support. Examples of carrier materials include, but are not limited to, powders, such as gamma-alumina, ceria-based powders, or any mixture of titania, silica, alumina (transition and alpha-phase), ceria, zirconia, $Ce_{1-a}Zr_aO_2$, and all of the possible doped ceria formulations. The washcoat may also include lanthanide oxides ($Ln_2O_3$) and/or strontium oxide (SrO).

Alumina is typically utilized in the washcoat as a high surface area carrier solid or support. The alumina in the washcoat is normally referred to as "gamma alumina" or "activated alumina" and typically has a BET surface area of 60 $m^2/g$ or more, often about 200 $m^2/g$ or more. The activated alumina is usually a mixture of gamma and delta phases of alumina but may also contain eta, kappa, and theta alumina phases.

If the washcoat contains alumina, in accordance with embodiments of the present invention, the washcoat may contain approximately 10 to approximately 100 wt % alumina, approximately 40 to approximately 70 wt % alumina, or approximately 55 to approximately 65 wt % alumina. Modifiers may optionally be added to the alumina to retard undesired phase transitions of the alumina from the gamma phase to the alpha phase when the alumina is exposed to elevated temperatures. The modifiers or thermal stabilizers may include, for example, one or more modifiers or stabilizers selected from rare earth oxides, silicon oxides, oxides of Group IVB metals (zirconium, hafnium, or titanium), or alkaline earth oxides.

In one embodiment of the present invention, a solution of lanthanide nitrate and/or strontium nitrate is added to the carrier oxide materials as a modifier for the alumina. The lanthanide nitrate solution may contain a single lanthanide nitrate, for example, lanthanum nitrate, or the solution may contain a mixture of lanthanide nitrates. Heating or calcining the lanthanide nitrate and/or strontium nitrate forms lanthanide oxide ($Ln_2O_3$) and/or strontium oxide. Although either lanthanide nitrate or strontium nitrate alone may be added, in an exemplary embodiment of the present invention, both lanthanide nitrate and strontium nitrate are added to the washcoat.

The strontium oxide and/or lanthanide oxide help to stabilize the surface area of the alumina, when the alumina is exposed to high temperatures. In one embodiment of the present invention, the lanthanide nitrate solution is a solution of mixed lanthanides obtained from lanthanum concentrate, although other sources of lanthanides are suitable. The lanthanide nitrate and/or strontium nitrate may be added to the slurry of carrier solids and/or catalyst solids before the washcoat is formed, or the lanthanide nitrate and/or strontium nitrate may be added to an already-formed washcoat.

If the washcoat includes catalyst oxides, the catalyst oxides may be in a bulk form or in a dispersed form. "Bulk" means that the catalyst oxides are present as fine discrete particles. A "dispersed" catalyst is made up of a number of small catalyst particles on the surface of carrier materials.

In one embodiment of the present invention, a bulk form multi-phase catalyst may be formed by forming a water solution of the soluble precursor salts for the multi-phase catalyst in the appropriate ratio, drying the aqueous solution, and calcining the dried solution. In an alternative embodiment of the present invention, the soluble precursor salts are dissolved in water in the appropriate ratio, a material such as oxalic acid is added to the aqueous solution of precursor salts to precipitate a multi-phase catalyst precursor, and the precipitated multi-phase catalyst precursor is dried and calcined to form the bulk multi-phase catalyst.

A "dispersed" multi-phase catalyst can be prepared by dissolving the soluble precursor salts in water, impregnating the solution into carrier oxides, and calcining the carrier oxides and the impregnated precursor salts to form the dispersed multi-phase catalyst. In an eminent embodiment, the carrier oxides and the impregnated solution are dried slowly prior to calcining. Controlled, slow drying of the carrier solids and impregnated solution is found to reduce the chance of crystallization of one or more of the salts in the impregnated solution. In an embodiment, the dried impregnated solution in the carrier solids is homogeneous and amorphous.

In one embodiment of the present invention, the catalyst composition may include at least one cerium oxide-based material. The cerium oxide-based material may serve at least one of two purposes. First, the cerium oxide-based material may be a support or carrier material for the multi-phase catalyst or other components of the catalyst composition. Second, the cerium-oxide material may act as an Oxygen Storage Material (OSM). When automobile converters are exposed to exhaust gas from a vehicle, the exhaust is typically alternately rich or lean. Oxygen Storage Materials supply oxygen to rich exhaust and take up oxygen from lean exhaust, buffering the catalyst against the fluctuating supply of oxygen in the feed gas. When an Oxygen Storage Material is present in the three-way catalyst composition, the inlet air/fuel ratio may vary significantly without detriment to the conversion efficiency.

Peter Eastwood describes other benefits of ceria (cerium oxide or $CeO_2$) in Chapter 5 of "Critical Topics in Exhaust Gas Treatment" (Research Studies Press Ltd, Baldock, Hertfordshire, England, 2000), which is hereby incorporated herein by reference.

The cerium oxide-based material may be in a bulk form or in a dispersed form. If the cerium oxide-based material is in bulk form, it is present as fine discrete particles. A dispersed cerium oxide-based material is dispersed onto or is impregnated into another material.

The total surface area of cerium oxide-based materials is generally reduced when the cerium oxide-based materials are heated to temperatures of 800° C. or more. One or more metal oxides may be added to the cerium oxide-based material to decrease the degree of sintering of the cerium oxide-based material during exposure to high temperatures. The metal oxides that can be added to the cerium oxide-based materials may be, for example, one or more of $ZrO_2$, $Al_2O_3$, $La_2O_3$, or other rare earth oxide. For the purposes of this application, yttrium oxide is considered to be a rare earth oxide. In one embodiment of the present invention, the cerium oxide-based material has a composition with the formula:

$$Ce_{1-a}Zr_aO_{2-\delta1}, \text{ where}$$

$0<a<1$ and $\delta1$ is an oxygen deficiency. Generally, $0 \leq \delta1 \leq (1-a)/2$.

The oxygen deficiency in the formula of the cerium oxide-based material changes as the cerium oxide-based material takes up and releases oxygen.

In an alternative embodiment of the present invention, the cerium oxide-based material has a composition with the formula:

$$Ce_{1-c-d}Zr_cLa_dO_{2-\delta2}, \text{ where:}$$

Lan is at least one of Y, La, Pr, Nd, Sm, Eu, Gd, Ho, or Yb;
c>0.15;
0.15>d>0.01;
where the cerium oxide-based material has the fluorite crystal structure;
and
δ2 is an oxygen deficiency.
Generally,
0≦δ2<(1−c−d)/2.

The cerium oxide-based material may be a composite or a complete solid solution. More than one cerium oxide-based material may be included in the catalyst composition.

In accordance with embodiments of the present invention, the subscript a may be in the range of approximately 0.07 to approximately 0.70, in the range of approximately 0.15 to approximately 0.53, or in the range of approximately 0.15 to approximately 0.28. In accordance with embodiments of the present invention, the subscript c may be in the range of approximately 0.15 to approximately 0.8, in the range of approximately 0.32 to approximately 0.74, or in the range of approximately 0.5 to approximately 0.74. In accordance with embodiments of the present invention, the subscript y may be in the range of approximately 0.01 to approximately 0.15, in the range of approximately 0.02 to approximately 0.11, or in the range of approximately 0.04 to approximately 0.10.

The formulas of specific cerium oxide-based materials are generally simplified herein by writing the subscript on the oxygen as "2" rather than as "2-δ". For example, the formula $Ce_{0.68}Zr_{0.32}O_{2-\delta_1}$ is simplified herein to "$Ce_{0.68}Zr_{0.32}O_2$".

The commercially available cerium oxide-based material $Ce_{0.68}Zr_{0.32}O_2$ is an exemplary cerium oxide-based material, though other cerium oxide-based materials are also suitable.

In one embodiment of the present invention, one or more cerium oxide-based materials may be included in the washcoat. In accordance with embodiments of the present invention, the washcoat may include approximately 5 to approximately 10 wt % cerium oxide-based material, approximately 10 to approximately 80 wt % cerium oxide-based material, or approximately 20 to approximately 60 wt % cerium oxide-based material.

In one embodiment of the present invention, the catalyst composition may include a layer of cerium oxide-based material with the formula:

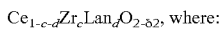$Ce_{1-c-d}Zr_cLan_dO_{2-\delta2}$, where:

Lan is at least one of Y, La, Pr, Nd, Sm, Eu, Gd, Ho, or Yb;
c>0.15;
0.15>d>0.01;
where the cerium oxide-based material has the fluorite crystal structure;
and
δ2 is an oxygen deficiency. Generally,
0≦δ2<(1−c−d)/2.

The cerium oxide-based material in the layer may be included in the catalyst composition in addition to one or more cerium oxide-based materials in the washcoat, or the cerium oxide based material in the layer may be the only cerium oxide-based material in the catalyst composition.

In one embodiment of the present invention, the layer may also contain alumina as a component in addition to the cerium oxide-based material component. The layer of cerium oxide-based material or cerium oxide-based material and alumina may be included in the catalyst composition as an underlayer under the washcoat or as an overlayer over the washcoat. If the washcoat of the catalyst composition contains a cerium oxide-based material, the cerium oxide-based material in the layer may be the same or different than the cerium oxide-based material in the washcoat.

In an embodiment, the layer may contain alumina as the only non-precious metal component.

In one embodiment of the present invention where the layer includes alumina as a non-precious metal component in addition to the oxide with the fluorite structure, additives such as lanthanide oxide and/or strontium oxide or their precursors may be added to the alumina to increase the thermal stability of the alumina. If alumina is included in the layer, the alumina in the layer may be the same as or different than the alumina in the washcoat. If alumina is included in the layer, in accordance with embodiments of the present invention, the weight ratio of alumina to oxide having the fluorite crystal structure in the layer may be between approximately 0.1:1 and approximately 1:0.4, between approximately 0.5:1 and approximately 1:0.8, or approximately 1:1.

The catalyst composition may include at least one precious metal component of platinum (Pt), rhodium (Rh), palladium (Pd), iridium (Ir), ruthenium (Ru), osmium (Os), silver (Ag), and the like. In one embodiment of the present invention, the precious metal component may be included in the catalyst composition in the multi-phase catalyst. The precious metal component in the multi-phase catalyst may be in addition to any precious metal which is included in M in the general formula, $Ce_yLn_{1-x}A_{x+s}MO_z$, of the multi-phase catalyst. Alternatively, the precious metal component may be included in the catalyst composition in the washcoat. In one embodiment of the present invention, a water-soluble salt of at least one precious metal component or noble metal is dissolved in water, and the catalyst composition is impregnated with the water solution containing the water-soluble salt or salts to introduce the precious metal components or noble metals into the catalyst composition.

Alternatively, or in addition, one or more base metals, such as iron (Fe), nickel (Ni), manganese (Mn), or cobalt (Co) may be included in or may be introduced into the catalyst composition. The base metals may be added to the catalyst composition by dissolving water-soluble salts of the base metal in water and impregnating the catalyst composition with the water solution of the water-soluble base metal salts. In an alternative embodiment of the present invention, the base metals may be added into the catalyst composition by co-mulling one or more base metal compounds with one or more components of the catalyst composition.

In accordance with the embodiments of the present invention, the layer of cerium oxide based material or cerium oxide based material and alumina may include precious metal components or noble metals, such as platinum (Pt), rhodium (Rh), palladium (Pd), iridium (Ir), ruthenium (Ru), osmium (Os), and the like. The layer may include base metals such as iron, nickel, manganese, cobalt, or copper, in addition to, or instead of, the precious metal components. The precious metal components or base metals in the layer may be in addition to precious metal components or base metals in the remainder of the catalyst composition. Alternatively, the precious metal components or base metals in the layer may be the only precious metal components or base metals in the catalyst composition.

The precious metal components and/or base metals in the layer may be supported on the cerium oxide based material, the alumina, or both the cerium oxide based material and the alumina. In an embodiment, different precious metal components and/or base metals or different ratios of the precious metal components and/or base metals may be supported on the cerium oxide based material, the alumina, or both the cerium oxide based material and the alumina in the layer.

In one embodiment of the present invention, the layer of cerium-oxide based material or cerium oxide based material and alumina includes at least one precious metal component selected from the group consisting of palladium, platinum, and rhodium. In another embodiment of the present invention, the layer includes platinum and/or rhodium. Although either platinum or rhodium alone may be included in the layer, in an exemplary embodiment of the present invention, the layer contains both platinum and rhodium. In accordance with embodiments of the present invention, the weight ratio of platinum to rhodium in the layer may be between about 0.3:1 and about 3:1, between about 0.4 and about 2, or about 1:1, where the weight ratios are all calculated on the basis of platinum and rhodium metals. In another exemplary embodiment, the layer includes rhodium as the only precious metal component.

In accordance with embodiments of the present invention, the platinum loading on the catalyst composition may be between about 1 and about 10 $g/ft^3$, between about 2 and 6 $g/ft^3$, or about 4 $g/ft^3$, all on the basis of platinum metal. The rhodium loading on the catalyst composition may be between about 2 $g/ft^3$ and about 8 $g/ft^3$, between about 3 $g/ft^3$ and 6 $g/ft^3$, or about 4 $g/ft^3$, all on the basis of rhodium metal.

In accordance with embodiments of the present invention, the loading of the layer of cerium-oxide based material or cerium oxide based material and alumina on the catalyst composition may be between about 20 g/L and 130 g/L, between about 30 g/L and about 100 g/L, or about 60 g/L. It is to be understood that the loading levels of the layer on the catalyst composition include the loading of the non-precious metal components, the alumina and/or the cerium oxide-based material, as well as the loading of the precious metal components.

A further aspect of the present invention provides a method for making a catalyst composition for simultaneous conversion of oxides of nitrogen, carbon monoxide, and hydrocarbons. The method includes:

(a) providing a substrate;
(b) providing at least one carrier material for forming a washcoat on the substrate;
(c) providing a solution for forming a multi-phase catalyst supported by the substrate, wherein the solution has a general cation formula of $Ce_yLn_{1-x}A_{x+s}M$; and
(d) forming the catalyst composition comprising the substrate, the washcoat, and the multi-phase catalyst.

The substrate, the washcoat, and the solution for forming the multi-phase catalyst were described previously.

The washcoat may be formed on the substrate from the carrier materials and/or the catalyst oxides by any methods that are known in the art. Examples of methods for forming a washcoat on a substrate are described in detail in U.S. Pat. Nos. 5,939,354 and 5,977,017, both of which are incorporated herein by reference in their entirety.

In one embodiment of the present invention, the carrier materials and/or catalyst solids are mixed into an aqueous solution to form a slurry, and the slurry is then deposited, i.e., washed, onto the substrate to form the washcoat. The slurry may be deposited onto the substrate in any suitable manner. For example, the substrate may be dipped into the slurry, or the slurry may be sprayed onto the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages contacts the washcoat on the walls of the passages as well as materials that are supported on the washcoat.

In one embodiment of the present invention, the washcoat is formed by slurry depositing the carrier material or carrier materials onto the substrate. The solution for forming the multi-phase catalyst is impregnated into the washcoat. The substrate, washcoat, and the impregnated solution are calcined to form the multi-phase catalyst and the catalyst composition. In an embodiment, the washcoat and the impregnated solution are dried before calcining. In one embodiment of the present invention, the washcoat may include other catalyst oxides in addition to the multi-phase catalyst.

In an alternative embodiment of the present invention, the solution for forming the multi-phase catalyst is impregnated into the carrier material, the carrier material and impregnated solution are dried and calcined, and the washcoat is formed after the carrier material and impregnated solution have been calcined. In another embodiment, the washcoat and impregnated solution are calcined after the washcoat is formed.

In yet another embodiment of the present invention, the multi-phase catalyst is formed in a bulk form from the solution. The washcoat is formed on the substrate by slurry depositing the bulk multi-phase catalyst onto the substrate. The substrate and washcoat on the substrate are dried and optionally calcined. The resulting catalyst composition contains bulk multi-phase catalyst as the only carrier material in the washcoat.

In an alternative embodiment of the present invention, bulk multi-phase catalyst is formed from the solution. The bulk multi-phase catalyst is mixed with carrier oxide solids, and the washcoat is formed on the substrate from the mixture of the bulk multi-phase catalyst and the carrier oxides. The substrate and washcoat are dried and optionally calcined to form the catalyst composition.

The embodiments of the method may further include forming a layer on the catalyst composition. The layer may be formed on the catalyst composition by any suitable method. In one embodiment of the present invention, a slurry of the non-precious metal components, the alumina and/or the oxide having the fluorite crystal structure, is mixed or milled and is coated on the washcoat and/or the multi-phase catalyst as an overlayer. In an embodiment, the calcined multi-phase catalyst composition and the overlayer are dried and heat treated at about 550° C. for about 2 hours.

In another embodiment, a slurry of the non-precious metal components is coated on the substrate as an underlayer, the underlayer is dried and calcined, and the washcoat and/or the multi-phase catalyst are placed over the underlayer. In an embodiment, the underlayer, washcoat and/or the multi-phase catalyst are dried and calcined.

In one embodiment of the present invention, where the layer includes precious metal components, the appropriate amounts of water-soluble salts of the precious metal components in water may be combined with a water slurry of the non-precious metal components, the alumina and/or the cerium-oxide based material having the fluorite crystal structure. The slurry of alumina and/or the oxide and the water-soluble salts of the precious metal components is thoroughly mixed or milled and is coated on or is mixed with the washcoat and/or the multi-phase catalyst. In an embodiment where the layer is an underlayer, the slurry is coated on the substrate.

In one embodiment of the present invention, where the layer includes both the cerium oxide-based material having the fluorite crystal structure as well as alumina as non-precious metal components, the water-soluble salts of the precious metal components may be combined with any combination of the non-precious metal components. The water-soluble salts may be combined with the oxide component, the alumina component, or both the oxide component and the alumina component.

A variety of water-soluble palladium, platinum, and rhodium salts may be used to prepare the layer with at least one precious metal component selected from the group consisting of palladium, platinum, and rhodium. The water-soluble salts may include, but are not limited to, palladium nitrate, palladium chloride, chloroplatinic acid, amine solubilized platinum hydroxide such as hexahydroxymonoethanolamine complexes of platinum, diamminedinitroplatinum (II), platinum nitrate, rhodium chloride, or rhodium nitrate. In one embodiment of the present invention, at least one of platinum nitrate and rhodium nitrate are used as the water-soluble platinum and rhodium salts in preparing the layer. In an alternative embodiment of the present invention, at least one of palladium nitrate and rhodium chloride may be used as the water-soluble palladium and rhodium salts.

The embodiments of the present invention of the multi-phase catalyst compositions described herein have an improved three-way catalytic activity compared to single-phase catalysts having similar compositions. The multi-phase catalyst compositions may be used for the removal of unsaturated and saturated hydrocarbons, nitrogen oxides, and carbon monoxide from the exhaust gases of internal combustion engines, including automobiles, small gasoline engines, and from industrial waste gases. They also exhibit high thermal and chemical stability. Further, they require a precious metal loading 5 to 15 times less than the commercial, conventional system.

Accordingly, the mixed phase catalysts have a wide range of applications. For example, the multi-phase catalysts may be used for clean up of exhaust emissions from a wide range of internal combustion engines. They may also be used in industrial catalysis for the production of industrial chemicals, fertilizers, and products in the polymer and plastics field. They may further be used in all oil-derived processes and products. They may be used for clean up of industrial process emissions including, but not limited to, volatile hydrocarbons, chlorinated hydrocarbons, and MTBE.

In particular, the multi-phase catalysts may be used, for example, for the control of gaseous and particulate emissions from all types of Otto cycle and Diesel cycle internal combustion engines (including Otto cycle lean-burn engines, Otto cycle and diesel cycle engines equipped with SCR (selective catalytic reduction) capability with ammonia or hydrocarbon intake), olefin polymerization, hydrogenation reactions, methanol synthesis from syngas (either carbon monoxide and hydrogen mixtures or mixtures also containing carbon dioxide), hydroformylation of alkenes, Fischer-Tropsch synthesis, isomerization of hydrocarbons, aromatization reactions, catalytic cracking reactions, reactions involving the removal of sulfur and/or nitrogen and/or oxygen from oil-derived hydrocarbons by hydrogenation, steam reforming of methanol and other hydrocarbons and hydrocarbon mixtures (e.g., gasoline) to produce gas mixtures containing hydrogen, the latter reactions where the hydrogen gas is used in a fuel-cell, epoxidation of alkenes, partial and/or selective oxidation of hydrocarbons, and oxidation of volatile organic compounds (VOCs), including MTBE. The multi-phase catalysts may be used as a SCR catalyst for NOx abatement for stationary sources with either hydrocarbons or ethanol as the reductive agent.

Embodiments of the catalyst composition of the present invention may be used in a method for the simultaneous conversion of oxides of nitrogen, carbon monoxide, and hydrocarbons in motor vehicle exhaust gas. A catalyst composition including the multi-phase catalyst is provided. The motor vehicle exhaust gas is contacted with the catalyst composition. Contacting the exhaust gas with the catalyst composition converts the gaseous exhaust effluents into relatively innocuous materials from an air pollution standpoint. The exhaust gas is contacted with the catalyst composition in the vapor phase at approximately one atmosphere pressure. Although some oxidation and reduction may occur at low temperatures, the reactions are normally conducted at elevated temperatures of at least 150° C., more preferably at temperatures of about 200° C. to about 900° C. The embodiments of the catalyst composition of the present invention are thus useful in promoting the oxidation of hydrocarbons, oxygen-containing organic compounds, and carbon monoxide, as well as the simultaneous reduction of nitrogen oxides.

The following examples are intended to illustrate, but not to limit, the scope of the invention. It is to be understood that other procedures known to those skilled in the art may alternatively be used.

Catalyst Compositions and Methods of Making Thereof

Preparation of Washcoat

The following example describes the preparation of a typical washcoat. Unless otherwise stated, the washcoats in the following examples were prepared with components, ratios of components, and procedures generally similar to the following procedure.

A typical washcoat was prepared by mixing 655 g of $Ce_{0.68}Zr_{0.32}O_2$, 982 g of alumina powder, 66.3 g of $Sr(NO_3)_2$, and 118.3 g of 27 wt % mixed lanthanide nitrate solution (commercially available as lanthanum nitrate product code 5248 from Molycorp, Inc., Mountain Pass, Calif.) with 2000 ml of deionized water. The slurry was milled in a Szegvari Type IS Atrittor until the rheology was suitable for coating the support.

A cordierite honeycomb support with 600 cells per square inch was dipped into the slurry. Excess slurry was blown from the support with an air jet. The support was dried in flowing air at room temperature, was heat-treated in air at about 150° C., and was calcined at 750° C. for 4 hours.

EXAMPLE 1

Preparation and Activity Testing of a Multi-Phase Catalyst

A solution with a cation ratio of $Ce_{0.80}Ln_{0.80}Sr_{0.20}Mn_{0.88}Pd_{0.12}$ was formed by combining 22.24 g of a 27.0 wt % ($Ln_2O_3$ basis) mixed lanthanide nitrate solution (commercially available as lanthanum nitrate product code 5248 from Molycorp, Inc, Mountain Pass, Calif., derived from a Bastnasite ore), 21.85 g of 28.5 wt % cerium nitrate solution ($CeO_2$ basis), 2.0 g of strontium nitrate ($Sr(NO_3)_2$), 10.48 g of manganese acetate ($Mn(OAc)_2.4H_2O$), and 5.62 g of 11.08 wt % palladium nitrate solution (palladium metal basis) in 300 cc of water. Lanthanum nitrate product code 5248 is a lanthanum concentrate product. A cordierite honeycomb with 600 cells per square inch which had been coated with a mixture of gamma-alumina and $Ce_{0.68}Zr_{0.32}O_2$ (in a weight ratio of 3:1) was dipped in the solution and was blown free of excess solution. The piece was dried in flowing air at room temperature, heat-treated in air at about 150° C., and then heat-treated at 700° C. for 10 hours in air. The final body contained a palladium concentration of 11.7 g per cubic foot of catalyst (palladium metal basis).

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric gas mixtures were measured as 96.5%, 97.8%, and 96.5% for NO, CO, and HC, respectively.

EXAMPLE 2

Preparation and Activity Testing of a Multi-Phase Catalyst

A solution with a cation ratio of $Ln_{0.8}Sr_{2.0}Mn_{0.88}Pd_{0.12}$ was formed by combining 22.24 g of a 27.0 wt % mixed lanthanum nitrate solution (commercially available as lanthanum nitrate product code 5248 from Molycorp, Inc, Mountain Pass, Calif., derived from a Bastnasite ore), 19.98 g of strontium nitrate ($Sr(NO_3)_2$), 10.48 g of manganese acetate ($Mn(OAc)_2 \cdot 4H_2O$), and 5.62 g of 11.08 wt % palladium nitrate solution (palladium metal basis) in 300 cc of water. A cordierite honeycomb with 600 cells per square inch that had been coated with a mixture of gamma-alumina and $Ce_{0.68}Zr_{0.32}O_2$ (in a weight ratio of 3:1) was dipped in the solution and was blown free of excess solution. The piece was dried in flowing air at room temperature, heat-treated in air at about 150° C., and then heat-treated at 700° C. for 10 hours in air. The final body contained a palladium concentration (palladium metal basis) of 9.2 g per cubic foot of catalyst.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 450° C. Three-way conversion efficiencies at stoichiometric gas mixtures were measured as 96.1%, 95.8%, and 92.5% for NO, CO, and HC, respectively.

EXAMPLE 3

Preparation and Activity Testing of a Multi-Phase Catalyst

A solution having a cation ratio of $Ce_{0.8}Ln_{0.80}Sr_{2.0}Mn_{0.88}Pd_{0.12}$ was formed by combining 44.48 g of a 27.0 wt % mixed lanthanide nitrate solution (commercially available as lanthanum nitrate product code 5248 from Molycorp, Inc, Mountain Pass, Calif., derived from a Bastnasite ore), 43.70 g of 28.5 wt % cerium nitrate solution ($CeO_2$ basis), 38.52 g of strontium nitrate ($Sr(NO_3)_2$), 20.96 g of manganese acetate ($Mn(OAc)_2 \cdot 4H_2O$), and 10.44 g of 11.08 wt % palladium nitrate solution (palladium metal basis) in 300 cc of water. A cordierite honeycomb with 600 cells per square inch that had been coated with a mixture of gamma-alumina and $Ce_{0.68}Zr_{0.32}O_2$ (total loading 185 g/L, in a weight ratio of 3:1) was dipped in the solution and was blown free of excess solution. The piece was dried in flowing air at room temperature, heat-treated in air at about 150° C., and then heat-treated at 700° C. for 10 hours in air. The final body contained a palladium concentration (palladium metal basis) of 19.3 g per cubic foot of catalyst.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric gas mixtures were measured as 99.1%, 98.8%, and 97.5% for NO, CO, and HC, respectively.

EXAMPLE 4

Preparation and Activity Testing of a Multi-Phase Catalyst

A solution with a cation ratio of $Ce_{0080}Ln_{0.80}Sr_{2.0}Mn_{0.94}Pd_{0.6}$ was formed by combining 44.48 g of a 27.0 wt % mixed lanthanide nitrate solution (commercially available as lanthanum nitrate product code 5248 from Molycorp, Inc, Mountain Pass, Calif., derived from a Bastnasite ore), 43.70 g of 28.5 wt % cerium nitrate solution ($CeO_2$ basis), 38.52 g of strontium nitrate ($Sr(NO_3)_2$), 20.96 g of manganese acetate ($Mn(OAc)_2 \cdot 4H_2O$), and 5.22 g of 11.08 wt % palladium nitrate solution (palladium metal basis) in 300 cc of water. A cordierite honeycomb with 600 cells per square inch that had been coated with a mixture of gamma-alumina and $Ce_{0.68}Zr_{0.32}O_2$ (total loading 185 g/L, in a weight ratio of 3:1) was dipped in the solution and was blown free of excess solution. The piece was dried in flowing air at room temperature, heat-treated in air at about 150° C., and then heat-treated at 700° C. for 10 hours in air. The final body contained a palladium concentration (palladium metal basis) of 20.3 g per cubic foot of catalyst.

Figure 2:
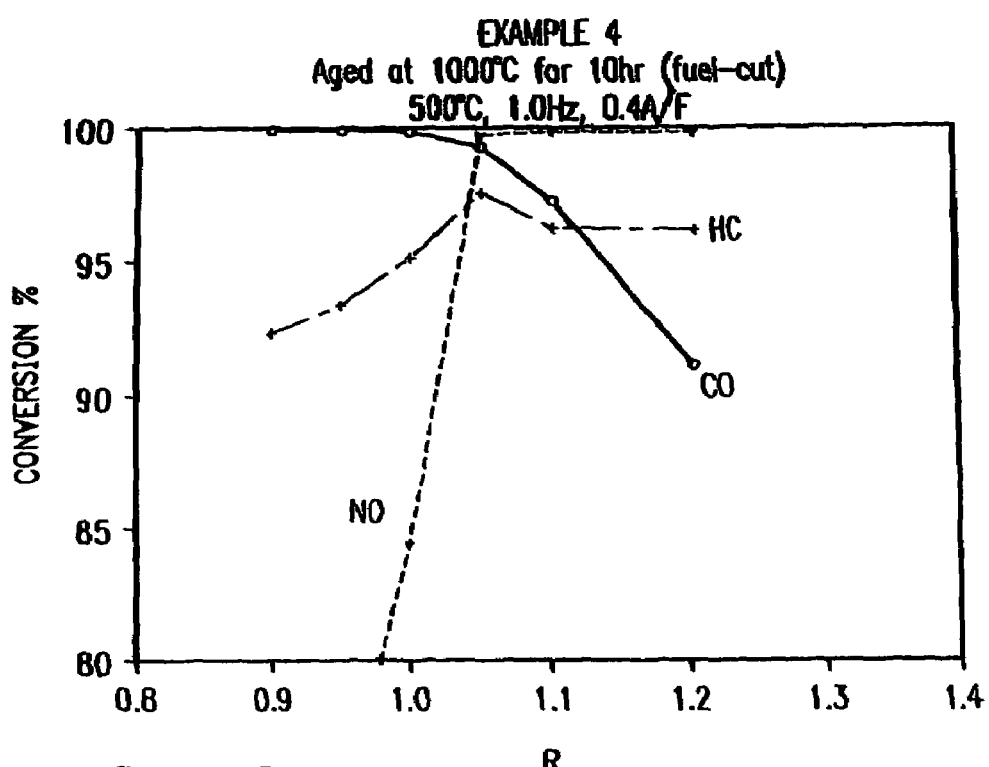
FIG. 2 is a graph of percent three-way conversion versus R for the multi-phase catalyst composition of Example 4.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric gas mixtures were measured as 99.2%, 99.1%, and 97.5% for NO, CO, and HC, respectively. The results are plotted in FIG. 2.

EXAMPLE 5

Preparation and Activity Testing of a Multi-Phase Catalyst

A solution with a cation ratio of $Ce_{0.80}Ln_{0.80}Sr_{2.0}Mn_{0.88}Pd_{0.12}$ was formed by combining 44.48 g of a 27.0 wt % mixed lanthanide nitrate solution (commercially available as lanthanum nitrate product code 5248 from Molycorp, Inc, Mountain Pass, Calif., derived from a Bastnasite ore), 43.70 g of 28.5 wt % cerium nitrate solution ($CeO_2$ basis), 38.52 g of strontium nitrate ($Sr(NO_3)_2$), 20.96 g of manganese acetate ($Mn(OAc)_2 \cdot 4H_2O$), and 10.44 g of 11.08 wt % palladium nitrate solution (palladium metal basis) in 300 cc of water. A cordierite honeycomb with 600 cells per square inch that had been coated with a mixture of gamma-alumina and $Ce_{0.24}Zr_{0.67}La_{0.09}O_2$ (total loading 185 g/L, in a weight ratio of 1.5:1) was dipped in the solution and was blown free of excess solution. The piece was dried in flowing air at room temperature, heat-treated in air at about 150° C., and then heat-treated at 700° C. for 10 hours in air. The final body contained a palladium concentration (palladium metal basis) of 21.0 g per cubic foot of catalyst.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric gas mixtures were measured as 99.4%, 98.9%, and 96.9% for NO, CO, and HC, respectively. This performance was similar to a commercial "tri-metal system" with total precious metal loading of 280 g per cubic foot of catalyst.

The following example describes the preparation of a bulk multi-phase catalyst.

EXAMPLE 6

Preparation and Activity Testing of a Bulk Multi-Phase Catalyst

A solution with a cation ratio of $Ce_{1.50}Ln_{0.60}Sr_{0.40}Mn_{0.95}Pd_{0.5}$ was formed by combining mixed lanthanide nitrate solution (commercially available as lanthanum nitrate product code 5248 from Molycorp, Inc, Mountain Pass, Calif., derived from a Bastnasite ore), cerium nitrate solution, strontium nitrate, manganese acetate, and palladium nitrate solution in water. The solution was dried in a drying oven at 110° C. for 24 hours and then heat-treated at 400° C., and finally 800° C. for 10 hours. The powder was a two-phase mixture of ceria and perovskite, as shown by X-ray diffraction data, with an overall specific surface area of 12 square meters per gram. The powder was mixed with $Ce_{0.24}Zr_{0.67}La_{0.09}O_2$ and alumina in a ball-mill and was slurry-coated onto a 600-cell cordierite honeycomb. The Pd concentration (palladium metal basis) was 18.0 g per cubic foot of catalyst after drying and high temperature heat treatment.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies with at or near stoichiometric gas mixtures were measured as 93.1%, 97.8%, and 97.5% for NO, CO, and HC, respectively.

EXAMPLE 7

Preparation and Activity Testing of a Multi-Phase Catalyst

A cordierite honeycomb with 600 cells per square inch was coated with a slurry mixture of gamma-alumina and $Ce_{0.24}Zr_{0.67}La_{0.09}O_2$ (in a weight ratio of 1.5:1). Prior to coating, a solution made from mixed lanthanide nitrate solution (commercially available as lanthanum nitrate product code 5248 from Molycorp, Inc, Mountain Pass, Calif., derived from a Bastnasite ore), and strontium nitrate was added to the slurry. The amount of lanthanide nitrate solution and strontium nitrate were such that the equivalent of 2 g of SrO and 2 g $Ln_2O_3$ were added, relative to each 100 g of the other solids present in the slurry. The honeycomb was heated at 150° C. (2 hours), 400° C. (2 hours), and 750° C. (4 hours). The washcoat loading was 185 g/L.

A solution with a cation ratio of $Ce_{0.64}Ln_{0.64}Sr_{1.60}Mn_{0.72}Pd_{0.28}$ was formed by combining 168.35 g of a 27.0 wt % mixed lanthanide nitrate solution (commercially available as lanthanum nitrate product code 5248 from Molycorp, Inc, Mountain Pass, Calif., derived from a Bastnasite ore), 165.60 g of 28.5 wt % cerium nitrate solution ($CeO_2$ basis), 145.05 g of strontium nitrate ($Sr(NO_3)_2$), 76.61 g of manganese acetate ($Mn(OAc)_2 \cdot 4H_2O$), and 110.99 g of an 11.50 wt % palladium nitrate solution (palladium metal basis) with water to form a solution with a total volume of 3.0 L.

The wash-coated cordierite honeycomb was dipped in the solution and was blown free of excess solution. The piece was dried, heat-treated at a low temperature, and then heat-treated at 700° C. for 4 hours in air. The final body contained a palladium concentration (palladium metal basis) of 25.0 g per cubic foot of catalyst.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric, gas mixtures were measured as 97.5%, 98.9%, and 99.0% for NO, CO, and HC, respectively.

The following example describes the preparation of a single-phase catalyst.

EXAMPLE 8

Preparation and Activity Testing of a Single-Phase Catalyst

In contrast to the above examples, the three-way catalyst of Example 8 did not contain any excess Ce or Sr. It can be described as a single-phase perovskite having the composition $Ln_{0.80}Sr_{0.20}Mn_{0.88}Pd_{0.12}O_3$. The catalyst was formed by combining 22.24 g of a 27.0 wt % mixed lanthanide nitrate solution (commercially available as lanthanum nitrate product code 5248 from Molycorp, Inc, Mountain Pass, Calif., derived from a Bastnasite ore), 2.0 g of strontium nitrate ($Sr(NO_3)_2$), 10.48 g of manganese acetate ($Mn(OAc)_2 \cdot 4H_2O$), and 5.62 g of 11.08 wt % palladium nitrate solution (palladium metal basis) in 300 cc of water. A cordierite honeycomb with 600 cells per square inch that had been coated with a mixture of gamma-alumina and $Ce_{0.68}Zr_{0.32}O_2$ (in a weight ratio of 3:1) was dipped in the solution and was blown free of excess solution. The piece was dried in flowing air at room temperature, heat-treated in air at about 150° C., and then heat-treated at 700° C. for 10 hours in air. The final body contained a palladium concentration (palladium metal basis) of 19.6 g per cubic foot of catalyst.

Figure 3:
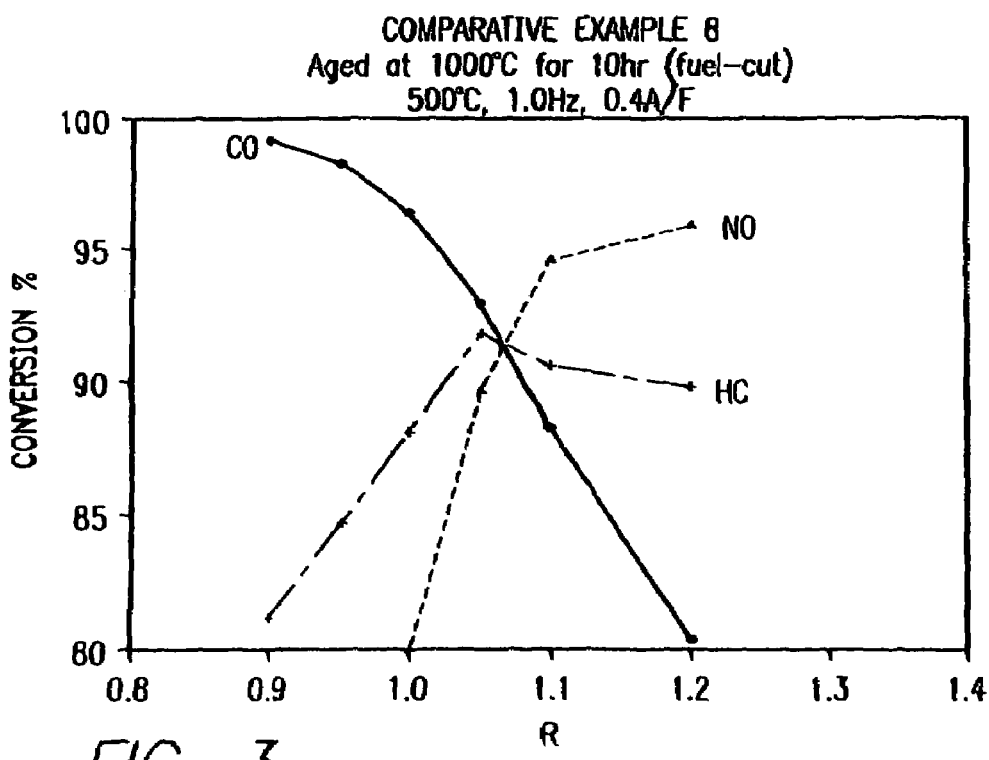
FIG. 3 is a graph of percent three-way conversion versus R for the single-phase catalyst composition of Example 8.

The three-way conversion activity of the catalyst was measured after high-temperature aging at 1000° C. for 10 hours in a fuel-cut gas chemistry (56 seconds stoichiometric, 4 s A/F ~20) at a space velocity of 100,000 hr$^{-1}$. The activity performance measurements were carried out in a perturbed feedstream with a 1.0 Hz frequency and a 0.4 A/F amplitude at 500° C. Three-way conversion efficiencies at stoichiometric gas mixtures were measured as 89.3%, 92.8%, and 91.5% for NO, CO, and HC, respectively. The results are plotted in FIG. 3. The performance of the single-phase catalyst of Example 8 was significantly poorer than that of the multi-phase catalysts described in the previous examples.

Examples 9 and 10 describe the preparation of multi-phase catalysts without and with an overlayer.

EXAMPLE 9

Preparation of a Multi-Phase Catalyst

A solution of cation ratio of $Ce_{0.80}Ln_{0.80}Sr_{2.00}Mn_{0.90}Pd_{0.35}$ was formed by combining 1549 g of a 27.0% mixed lanthanide nitrate solution (commercially available as lanthanum nitrate product code 5248 from Molycorp, Inc, Mountain Pass, Calif., derived from a Bastnasite ore), 1485 g of 28.5 wt % cerium nitrate solution (on the basis of $CeO_2$), 1342 g of strontium nitrate ($Sr(NO_3)_2$), 699.5 g of manganese acetate ($Mn(OAc)_2.4H_2O$), 2166 g of malic acid, and 952.4 g of 12.4 wt % palladium nitrate solution (on the basis of palladium metal). The solution was diluted with deionized water to a volume of 20:1. A cordierite honeycomb with 600 cells per square inch was coated with 135.3 g of washcoat formed from a 1.5:1 suspension of alumina and $Ce_{0.24}Zr_{0.67}La_{0.9}O_2$ with sufficient $Sr(NO_3)_2$ and mixed lanthanide nitrate to form the equivalent of 2 g of SrO and 2 g of lanthanide oxide/100 g of the other solids in the slurry. The coated honeycomb was dipped in the solution and blown free of excess solution. The piece was dried in flowing air at room temperature, heat-treated in air at about 150° C., and was then heat-treated at 700° C. for 4 hours in air. The final body contained 27.9 grams of palladium per cubic foot of catalyst (on the basis of palladium metal).

The following example describes the preparation of a multi-phase catalyst with an overlayer containing platinum and rhodium.

EXAMPLE 10

Preparation of a Multi-Phase Catalyst with an Overlayer Containing Platinum and Rhodium A solution of cation ratio of $Ce_{0.80}Ln_{0.80}Sr_{2.00}Mn_{0.90}Pd_{0.35}$ was formed by combining 242.9 g of a 27.0% mixed lanthanide nitrate solution (commercially available as lanthanum nitrate product code 5248 from Molycorp, Inc, Mountain Pass, Calif., derived from a Bastnasite ore), 232.8 g of 28.5 wt % cerium nitrate solution (on the basis of $CeO_2$), 210.4 g of strontium nitrate ($Sr(NO_3)_2$), 109.7 g of manganese acetate ($Mn(OAc)_2.4H_2O$), and 1610 g of 11.5 wt % palladium nitrate solution (on the basis of palladium metal) in 300 cc of water. A cordierite honeycomb with 600 cells per square inch which had been coated with 133 g of washcoat formed from a mixture of gamma-alumina and $Ce_{0.68}Zr_{0.32}O_2$ (in a weight ratio of 1.5:1) with the equivalent of 2% SrO and $Ln_2O_3$ was dipped in the solution and was blown free of excess solution. The piece was dried in flowing air at room temperature, heat-treated in air at about 150° C., and was then heat-treated at 700° C. for 10 hours in air to form a multi-phase catalyst. The final body contained 28 grams of palladium per cubic foot of catalyst (on the basis of palladium metal).

A total of 10.805 g of rhodium chloride (40.0 wt % rhodium, on a metal basis) was dissolved in 30 g of deionized water. The rhodium chloride solution was combined with 43.657 g of 9.90 wt % aqueous dinitrodiammineplatinum (II) (platinum metal basis). The solution was added to 3873 g of an aqueous slurry containing 42.9% $Ce_{0.24}Zr_{0.67}La_{0.09}O_2$ solids. The combination was thoroughly milled in a ball mill. The milled slurry was coated as an overlayer onto the multi-phase catalyst. The catalyst with the overlayer was dried in flowing air at ambient conditions for 4 hours. The dried catalyst was heat-treated at 150° C. for 1 hour and 550° C. for 2 hours. The overlayer loading was 55 g/L. The catalyst contained 4.05 g of platinum and 4.05 g of rhodium per cubic foot of catalyst.

The activities of the multi-phase catalysts of Examples 9 and 10, with and without an overlayer, are compared in the following example.

EXAMPLE 11

Comparison of Three-Way Activities of Multi-Phase Catalysts With and Without Overlayers The three-way conversion activities of the multi-phase catalysts of Examples 9 and 10 were measured after high-temperature aging at 1000° C. for 10 hours in a fuel-cut gas chemistry (56 seconds stoichiometric, 4 s A/F ~20) at a space velocity of 100,000 $hr^{-1}$. The activity performance measurements were carried out in oscillating light-off tests with a perturbed feed stream with a 1.0 Hz frequency and a 0.4 A/F amplitude in a temperature range of 275-400° C. The $T_{50}$ temperatures for NO, CO, and HC, as well as the three-way conversion activities at 400° C. for stoichiometric or near-stoichiometric mixtures for NO, CO, and HC are shown in Table 1 below.

TABLE 1

Three-Way Conversion Activities of Multi-Phase Catalysts With and Without Overlayers

| Catalyst | Pt/Rh Overlayer | $T_{50}$ (° C.) | | | Conversion at 400° C. | | |
|---|---|---|---|---|---|---|---|
| | | NO | CO | HC | NO | CO | HC |
| Example 9 | No | 366 | 309 | 334 | 68.2 | 94.8 | 88.8 |
| Example 10 | Yes | 364 | 314 | 336 | 91.0 | 98.9 | 93.4 |

The catalyst of Example 10 with the platinum/rhodium overlayer had significantly higher activity than the catalyst of Example 9 without an overlayer, particularly for NO conversion, as shown by the 400° C. conversion data. The NO conversion at 400° C. was 91.0% for the catalyst of Example 10 with the overlayer compared to 68.2% for the catalyst of Example 9 without an overlayer. Adding the overlayer containing platinum and rhodium therefore significantly increased the catalyst activity for NO conversion.

EXAMPLE 12

Preparation of a Multi-Phase Catalyst

A multi-phase catalyst similar to the catalyst of Example 9 was prepared, except that a different alumina was used in the washcoat. The alumina in the washcoat of Example 9 had an average pore diameter of approximately 8 nm, while the alumina used to prepare the washcoat of the multi-phase catalyst of Example 12 had an average pore diameter of approximately 20 nm.

The final catalyst contained 24.9 grams of palladium per cubic foot of catalyst (on the basis of palladium metal).

The following example describes the preparation of a multi-phase catalyst with an overlayer containing platinum and rhodium. The overlayer contains both a cerium oxide based material and alumina.

EXAMPLE 13

Preparation of a Multi-Phase Catalyst with an Overlayer Containing $Ce_{0.24}Zr_{0.66}La_{0.04}Y_{0.06}O_2$, Alumina, Platinum and Rhodium A catalyst similar to the catalyst of Example 12 was prepared. The catalyst contained 25.25 g of palladium per cubic ft of catalyst (measured as palladium metal).

An aqueous slurry was formed by adding a mixture of a 1:1.5 weight ratio of the same alumina that was used to form the washcoat in Example 12 and $Ce_{0.24}Zr_{0.66}La_{0.04}Y_{0.06}O_2$. Sufficient strontium nitrate and lanthanum concentrate nitrate were added to the slurry to form the equivalent of 2 wt % SrO and 2 wt % LnO on the overlayer.

The combination was thoroughly milled in an attrition mill. Aqueous solutions of rhodium nitrate and platinum nitrate were added to the milled slurry. The slurry was coated as an overlayer onto the multi-phase catalyst. The catalyst with the overlayer was dried in flowing air at ambient conditions for 4 hours. The dried catalyst was heat-treated at 150° C. for 1 hour and 550° C. for 2 hours. The overlayer loading was 65.4 g/L. The catalyst contained 4.07 g of platinum and 4.07 g of rhodium per cubic foot of catalyst.

The activities of the multi-phase catalysts of Examples 12 and 13, with and without an overlayer, are compared in the following example.

EXAMPLE 14

Comparison of Three-Way Activities of Multi-Phase Catalysts With and Without Overlayers The three-way conversion activities of the multi-phase catalysts of Examples 12 and 13 were measured after high-temperature aging at 980° C. for 40 hours in a fuel-cut gas chemistry (56 seconds stoichiometric, 4 s A/F ~20) at a space velocity of 100,000 $hr^{-1}$. The activity performance measurements were carried out in oscillating conversion tests with a perturbed feed stream with a 1.0 Hz frequency and a 0.4 A/F amplitude at a temperature of 400° C. The three-way conversion activities at 400° C. for near-stoichiometric mixtures for NO, CO, and HC at a space velocity of 100,000 $hr^{-1}$ are shown in Table 2 below.

TABLE 2

Three-Way Conversion Activities of Multi-Phase Catalysts With and Without Overlayers

| Catalyst | Pt/Rh Overlayer | Conversion at 400° C. | | |
|---|---|---|---|---|
| | | NO | CO | HC |
| Example 12 | No | 65.3 | 97.2 | 85.0 |
| Example 13 | Yes | 87.3 | 99.0 | 88.9 |

The catalyst of Example 13 with the platinum/rhodium alumina/$Ce_{0.24}Zr_{0.66}La_{0.04}Y_{0.06}O_2$ overlayer had significantly higher activity than the catalyst of Example 12 without an overlayer, particularly for NO conversion. The NO conversion at 400° C. was 87.3% for the catalyst of Example 13 with the overlayer compared to 65.3% for the catalyst of Example 12 without an overlayer. Adding the overlayer containing platinum and rhodium therefore significantly increased the catalyst activity for NO conversion.

EXAMPLE 15

Preparation and Testing of a Multi-Phase Catalyst with an Overlayer Containing Rhodium An aqueous solution of rhodium nitrate is combined with an aqueous slurry of $Ce_{0.24}Zr_{0.67}La_{0.09}O_2$ solids. The combination is thoroughly milled in a ball mill and is coated on the multi-phase catalyst of Example 1. The catalyst with the overlayer is dried in flowing air at ambient conditions for 4 hours. The dried catalyst is heat-treated at 150° C. for 1 hour and 550° C. for 2 hours. The multi-phase catalyst with the overlayer containing rhodium is expected to be an effective three-way catalyst with higher activity than the catalyst of Example 1, which does not have an overlayer containing rhodium.

EXAMPLE 16

Preparation and Testing of a Multi-Phase Catalyst with an Overlayer Containing Platinum/$Al_2O_3$ and Rhodium/$Ce_{0.24}Zr_{0.67}La_{0.0}O_2$ An aqueous solution of rhodium nitrate is combined with an aqueous slurry of alumina. An aqueous solution of platinum nitrate is combined with an aqueous slurry of $Ce_{0.24}Zr_{0.67}La_{0.09}O_2$. The two slurries are combined and are thoroughly milled in a ball mill. The combined slurries are coated on the multi-phase catalyst of Example 2. The catalyst with the overlayer is dried in flowing air at ambient conditions for 4 hours. The dried catalyst is heat-treated at 150° C. for 1 hour and 550° C. for 2 hours. The multi-phase catalyst with the overlayer containing platinum/alumina and rhodium/$Ce_{0.24}Zr_{0.67}La_{0.09}O_2$ is expected to be an effective three-way catalyst with higher activity than the catalyst of Example 2, which does not have an overlayer containing platinum/alumina and rhodium/$Ce_{0.24}Zr_{0.67}La_{0.09}O_2$.

EXAMPLE 17

Preparation and Testing of a Multi-Phase Catalyst with an Overlayer Containing Platinum and Rhodium on $Al_2O_3$ and $Ce_{0.24}Zr_{0.67}La_{0.0}O_2$ An aqueous solution of rhodium nitrate and platinum nitrate is combined with an aqueous slurry of alumina and $Ce_{0.24}Zr_{0.67}La_{0.09}O_2$. The slurry is thoroughly milled in a ball mill and is coated on the multi-phase catalyst of Example 3. The catalyst with the overlayer is dried in flowing air at ambient conditions for 4 hours. The dried catalyst is heat-treated at 150° C. for 1 hour and 550° C. for 2 hours. The multi-phase catalyst with the overlayer containing platinum and rhodium on alumina and $Ce_{0.24}Zr_{0.67}La_{0.09}O_2$ is expected to be an effective three-way catalyst with higher activity than the catalyst of Example 3, which does not have an overlayer containing platinum and rhodium.

EXAMPLE 18

Preparation and Testing of a Multi-Phase Catalyst with an Underlayer Containing Platinum and Rhodium on $Al_2O_3$ and $Ce_{0.24}Zr_{0.67}La_{0.09}O_2$ An aqueous solution of rhodium nitrate and platinum nitrate is combined with an aqueous slurry of alumina and $Ce_{0.24}Zr_{0.67}La_{0.09}O_2$. The slurry is thoroughly milled in a ball mill and is coated on a cordierite honeycomb substrate. The coated honeycomb is dried in flowing air at ambient conditions for 4 hours and is heat-treated at 150° C. for 1 hour and 550° C. for 2 hours.

A solution with a cation ratio of $Ce_{0.80}Ln_{0.80}Sr_{2.0}Mn_{0.94}Pd_{0.06}$ is formed according to the method of Example 4. A slurry is formed by combining the solution with a mixture of gamma-alumina and $Ce_{0.68}Zr_{0.32}O_2$. The slurry is coated onto the honeycomb support to form an underlayer containing platinum and rhodium. The piece is dried in flowing air at room temperature, heat-treated in air at about 150° C., and then heat-treated at 700° C. for 10 hours in air. The catalyst with the underlayer containing platinum and rhodium is expected to be an effective three-way catalyst with higher activity than the catalyst of Example 4, which does not have an underlayer containing platinum and rhodium.

In the following example, palladium is impregnated into the catalyst composition after the multi-phase catalyst is formed.

EXAMPLE 19

Preparation of a Multi-Phase Catalyst with Impregnated Palladium

A solution of cation ratio of $Ce_{0.80}Ln_{0.80}Sr_{2.00}Mn_{1.00}$ is formed. A cordierite honeycomb with 600 cells per square inch is coated with a washcoat formed from a 1.5:1 suspension of alumina and $Ce_{0.24}Zr_{0.67}La_{0.09}O_2$ with sufficient $Sr(NO_3)_2$ and mixed lanthanide nitrate to form the equivalent of 2 g of SrO and 2 g of lanthanide oxide/100 g of the other solids in the slurry. The coated honeycomb is dipped in the solution and is blown free of excess solution. The piece is dried in flowing air at room temperature, is heat-treated in air at about 150° C., and is then heat-treated at 700° C. for 4 hours in air. The resulting multi-phase catalyst composition does not contain palladium.

An aqueous solution of palladium nitrate is prepared and is impregnated into the multi-phase catalyst composition. The impregnated catalyst is dried in flowing air at room temperature, is heat-treated in air at 700° C. for 4 hours in air. The multi-phase catalyst with impregnated palladium is expected to be an effective three-way catalyst with greater activity than the corresponding multi-phase catalyst that does not contain palladium.

EXAMPLE 20

Preparation and Testing of a Multi-Phase Catalyst with an Overlayer Containing Platinum on $Al_2O_3$ An aqueous solution of platinum nitrate is combined with an aqueous slurry of alumina. The slurry is thoroughly milled in a ball mill and is coated on the multi-phase catalyst of Example 3. The catalyst with the overlayer is dried in flowing air at ambient conditions for 4 hours. The dried catalyst is heat-treated at 150° C. for 1 hour and 550° C. for 2 hours. The multi-phase catalyst with the alumina overlayer containing platinum on alumina is expected to be an effective three-way catalyst with higher activity than the catalyst of Example 3, which does not have an overlayer containing platinum on alumina.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A multi-phase catalyst for simultaneous conversion of oxides of nitrogen, carbon monoxide, and hydrocarbons represented by the general formula:

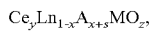

$Ce_yLn_{1-x}A_{x+s}MO_z$, wherein:
A is an element selected from the group consisting of Mg, Ca, Sr, Ba, Li, Na, K, Cs, Rb, and any combination thereof;
Ln is a mixture of elements originally in the form of single-phase mixed lanthanides collected from natural ores, a single lanthanide, or a mixture of artificial lanthanides;
M is an element selected from the group consisting of Fe, Mn, Cr, Ni, Co, Cu, V, Zr, Pt, Pd, Rh, Ru, Ag, Au, Al, Ga, Mo, W, Ti, and any combination thereof;
x is a number defined by $0 \leq x<1.0$;
y is a number defined by $0 \leq y<10$;
s is a number defined by $0 \leq s<10$; and
z is a number defined by $z>0$,
where s=0 only when y>0 and y=0 only when s>0.

2. The multi-phase catalyst of claim 1, wherein said multi-phase catalyst comprises a perovskite phase and a non-perovskite phase.

3. The multi-phase catalyst of claim 2, wherein the perovskite phase is represented by a general formula $Ln_{1-x}A_xMO_3$.

4. The multi-phase catalyst of claim 3, wherein the perovskite phase has a cation formula selected from the group consisting of $Ln_{0.8}Sr_{0.2}Mn_{0.88}Pd_{0.12}$, $Ln_{0.8}Sr_{0.2}Mn_{0.94}Pd_{0.6}$, $Ln_{0.60}Sr_{0.40}Mn_{0.95}Pd_{0.05}$, $Ln_{0.64}Sr_{0.36}Mn_{0.72}Pd_{0.28}$, and $Ln_{0.80}Sr_{0.20}Mn_{0.65}Pd_{0.35}$.

5. The multi-phase catalyst of claim 2, wherein the non-perovskite phase is selected from the group consisting of cerium oxide, an alkaline earth metal oxide represented by a formula AO, an alkali metal oxide represented by the formula $A_2O$, an alkaline earth metal carbonate, and combinations thereof.

6. The multi-phase catalyst of claim 5, wherein the non-perovskite phase is cerium oxide.

7. The multi-phase catalyst of claim 5, wherein the non-perovskite phase is an alkaline earth metal oxide represented by a formula AO.

8. The multi-phase catalyst of claim 7, wherein the alkaline earth metal oxide is SrO.

9. The multi-phase catalyst of claim 5, wherein the multi-phase catalyst comprises a first non-perovskite phase of cerium oxide, and a second non-perovskite phase of an alkaline earth metal oxide represented by a formula of AO.

10. The multi-phase catalyst of claim 9, wherein the alkaline earth metal oxide is SrO.

11. The multi-phase catalyst of claim 10, wherein the perovskite phase has a cation formula selected from the group consisting of $Ln_{0.64}Sr_{0.36}Mn_{0.72}Pd_{0.28}$ and $Ln_{0.80}Sr_{0.20}Mn_{0.65}Pd_{0.35}$.

12. The multi-phase catalyst of claim 1, wherein Ln is obtained from lanthanum concentrate.

13. The multi-phase catalyst of claim 1, wherein Ln is a mixture of elements originally in the form of single-phase mixed lanthanides collected from bastnasite.

14. The multi-phase catalyst of claim 1, wherein z is approximately $2y-1/2x+s+3$.

15. A catalyst composition, comprising:
(a) a substrate;
(b) a washcoat; and
(c) a multi-phase catalyst represented by the general formula:

$$Ce_yLn_{1-x}A_{x+s}MO_z,$$

wherein:
Ln is a mixture of elements originally in the form of single-phase mixed lanthanides collected from natural ores, a single lanthanide, or a mixture of artificial lanthanides;
A is an element selected from the group consisting of Mg, Ca, Sr, Ba, Li, Na, K, Cs, Rb, and combinations thereof;
M is an element selected from the group consisting of Fe, Mn, Cr, Ni, Co, Cu, V, Zr, Pt, Pd, Rh, Ru, Ag, Au, Al, Ga, Mo, W, Ti, and combinations thereof;
x is a number defined by $0 \leq x < 1.0$;
y is a number defined by $0 \leq y < 10$;
s is a number defined by $0 \leq s < 10$; and
z is a number defined by $z > 0$,
where $s=0$ only when $y>0$ and $y=0$ only when $s>0$.

16. The catalyst composition of claim 15, wherein the substrate is a metal or ceramic honeycomb support.

17. The catalyst composition of claim 15, wherein the washcoat comprises alumina and a cerium oxide-based material.

18. The catalyst composition of claim 17, wherein the washcoat comprises gamma-alumina, $Ce_{0.24}Zr_{0.67}La_{0.09}O_2$, SrO, and $Ln_2O_3$.

19. The catalyst composition of claim 15, wherein the alumina is gamma-alumina.

20. The catalyst composition of claim 15, wherein the cerium oxide-based material is selected from the group consisting of $Ce_{1-a}Zr_aO_{2-\delta 1}$ and $Ce_{1-c-d}Zr_cLan_dO_{2-\delta 2}$, wherein $0<a<1$;
Lan is at least one rare earth selected from the group consisting of Y, La, Pr, Nd, Sm, Eu, and Yb;
$c>0.15$;
$0.15>d>0.01$;
and
$\delta 1$ and $\delta 2$ are oxygen deficiencies.

21. The catalyst composition of claim 20, wherein the cerium oxide-based material is selected from the group consisting of $Ce_{0.68}Zr_{0.32}O_2$ and $Ce_{0.24}Zr_{0.67}La_{0.09}O_2$.

22. The catalyst composition of claim 15, wherein the multi-phase catalyst comprises a perovskite phase and a non-perovskite phase.

23. The catalyst composition of claim 22, wherein the perovskite phase is represented by a general formula of $Ln_{1-x}A_xMO_3$.

24. The catalyst composition of claim 23, wherein the perovskite phase has a cation formula selected from the group consisting of $Ln_{0.8}Sr_{0.2}Mn_{0.88}Pd_{0.12}$, $Ln_{0.8}Sr_{0.2}Mn_{0.94}Pd_{0.06}$, $Ln_{0.60}Sr_{0.40}Mn_{0.95}Pd_{0.05}$, $Ln_{0.64}Sr_{0.36}Mn_{0.72}Pd_{0.28}$, and $Ln_{0.80}Sr_{0.20}Mn_{0.65}Pd_{0.35}$.

25. The catalyst composition of claim 22, wherein the non-perovskite phase is selected from the group consisting of cerium oxide, an alkaline earth metal oxide represented by a formula AO, an alkali metal oxide represented by the formula $A_2O$, an alkaline earth metal carbonate, and combinations thereof.

26. The catalyst composition of claim 25, wherein the non-perovskite phase is cerium oxide.

27. The catalyst composition of claim 25, wherein the non-perovskite phase is an alkaline earth metal oxide represented by a formula of AO.

28. The catalyst composition of claim 27, wherein the alkaline earth metal oxide is SrO.

29. The catalyst composition of claim 25, comprising a first non-perovskite phase of cerium oxide, and a second non-perovskite phase of SrO.

30. The catalyst composition of claim 29, wherein the perovskite phase has a cation formula selected from the group consisting of $Ln_{0.8}Sr_{0.2}Mn_{0.88}Pd_{0.12}$, $Ln_{0.8}Sr_{0.2}Mn_{0.94}Pd_{0.06}$, $Ln_{0.60}Sr_{0.40}Mn_{0.95}Pd_{0.05}$, $Ln_{0.64}Sr_{0.36}Mn_{0.72}Pd_{0.28}$, and $Ln_{0.80}Sr_{0.20}Mn_{0.65}Pd_{0.35}$.

31. The catalyst composition of claim 15, further comprising at least one precious metal component selected from the group consisting of platinum, rhodium, palladium, iridium, ruthenium, osmium, and silver.

32. The catalyst composition of claim 31, wherein said at least one precious metal component is introduced into said catalyst composition by impregnating said catalyst composition with a solution of a water-soluble salt of said at least one precious metal component.

33. The catalyst composition of claim 15, further comprising at least one base metal.

34. The catalyst composition of claim 33, wherein said at least one base metal is introduced into said catalyst composition by impregnating said catalyst composition with a water solution of a water-soluble salt of said at least one base metal or by co-mulling at least one compound comprising said at least one base metal with at least one component of said catalyst composition.

35. The catalyst composition of claim 15, further comprising a layer comprising as a non-precious metal component a cerium oxide-based material with the formula:

$$Ce_{1-c-d}Zr_cLan_dO_{2-\delta 2}, \text{ where:}$$

Lan is at least one of Y, La, Pr, Nd, Sm, Eu, Gd, Ho, or Yb;
$c>0.15$; $0.15>d>0.01$; and
$\delta 2$ is an oxygen deficiency,
where the cerium oxide-based material has the fluorite crystal structure.

36. The catalyst composition of claim 35, wherein said layer is an overlayer.

37. The catalyst composition of claim 35, wherein said layer further comprises at least one precious metal component selected from the group consisting of palladium, platinum, and rhodium.

38. The catalyst composition of claim 35, wherein said layer comprises platinum and rhodium precious metal components.

39. The catalyst composition of claim 38, wherein a weight ratio of the platinum precious metal component to the rhodium precious metal component in said layer is between about 0.3:1 and about 3:1.

40. The catalyst composition of claim 38, wherein a weight ratio of the platinum precious metal component to the rhodium precious metal component in said layer is approximately 1:1.

41. The catalyst composition of claim 38, wherein a loading of said layer in said catalyst composition is more than about 20 g/liter and less than about 130 g/liter.

42. The catalyst composition of claim 38, wherein a loading of said platinum precious metal component in said catalyst composition is between about 1 g/ft$^3$ and about 10 g/ft$^3$ and a loading of said rhodium precious metal component in said catalyst composition is between about 2 g/ft$^3$ and about 8 g/ft$^3$.

43. The catalyst composition of claim 35, wherein said layer comprises a rhodium precious metal component.

44. The catalyst composition of claim 37, wherein said layer further comprises alumina as a non-precious metal component.

45. The catalyst composition of claim 44, wherein a weight ratio of said alumina to said cerium oxide-based material in said layer is between approximately 0.1:1 and approximately 1:0.4.

46. The catalyst composition of claim 37, wherein said at least one precious metal component is introduced into said layer by combining at least water-soluble salt of said at least one precious metal component with at least one non-precious metal component of said layer.

47. The catalyst composition of claim 46, wherein said at least one water-soluble salt is selected from the group consisting of platinum nitrate and rhodium nitrate.

48. The catalyst composition of claim 46, wherein said at least one water-soluble salt is selected from the group consisting of platinum nitrate and rhodium chloride.

49. The catalyst composition of claim 15, further comprising a layer comprising alumina as a non-precious metal component.

50. The catalyst composition of claim 49, wherein said layer further comprises platinum as a precious metal component.

51. A method of making a catalyst composition, the method comprising the steps of:
   (a) providing a substrate;
   (b) providing at least one carrier material for forming a washcoat on the substrate;
   (c) providing a solution for forming a multi-phase catalyst supported by the substrate, wherein the solution has a general cation formula of

   $Ce_yLn_{1-x}A_{x+s}M$, wherein:

Ln is a single lanthanide, a mixture of artificial lanthanides, or a mixture of elements originally in the form of single-phase mixed lanthanides collected from natural ores;
   A is an element selected from the group consisting of Mg, Ca, Sr, Ba, Li, Na, K, Cs, Rb, and combinations thereof; and
   M is an element selected from the group consisting of Fe, Mn, Cr, Ni, Co, Cu, V, Zr, Pt, Pd, Rh, Ru, Ag, Au, Al, Ga, Mo, W, Ti and combinations thereof;
   x is a number defined by $0 \leq x < 1.0$;
   y is a number defined by $0 \leq y < 10$;
   s is a number defined by $0 \leq s < 10$, and
   z is a number defined by $z > 0$,
   where s=0 only when y>0 and y=0 only when s>0; and
   (d) forming the catalyst composition comprising the substrate, the washcoat, and the multi-phase catalyst.

52. The method of claim 51, wherein step (d) comprises:
   (i) slurry depositing the carrier material onto the substrate to form a layer of washcoat;
   (ii) impregnating the solution into the washcoat; and
   (iii) calcining the substrate, washcoat, and the impregnated solution to form the multi-phase catalyst on the substrate.

53. The method of claim 52, further comprising drying the washcoat and impregnated solution before calcining.

54. The method of claim 51, wherein step (d) comprises:
   (i) forming the multi-phase catalyst in a bulk form from the solution;
   (ii) forming a slurry suspension of the carrier material and the bulk multi-phase catalyst; and
   (iii) depositing the slurry suspension onto the substrate to form the multi-phase catalyst on the substrate.

55. The method of claim 54, wherein forming said multi-phase catalyst in a bulk form comprises calcining said solution.

56. The method of claim 54, wherein forming said multi-phase catalyst in a bulk form comprises co-precipitating a multi-phase catalyst precursor from said solution and calcining said multi-phase catalyst precursor.

57. The method of claim 56, wherein co-precipitating said multi-phase catalyst precursor comprises contacting said solution with oxalic acid.

58. The method of claim 51, wherein step (d) comprises
   (i) impregnating the solution onto the carrier material;
   (ii) calcining the carrier material impregnated with the solution to form the multi-phase catalyst in the form of a dispersed multi-phase catalyst on the carrier material; and
   (iii) slurry depositing the carrier material with the dispersed multi-phase catalyst onto the substrate to form the multi-phase catalyst on the substrate.

59. The method of claim 51, wherein the substrate is a metal or ceramic honeycomb support.

60. The method of claim 51, wherein more than one carrier material is provided, and wherein the washcoat comprises alumina and a cerium oxide-based material.

61. The method of claim 60, wherein the alumina is gamma-alumina.

62. The method of claim 60, wherein the cerium oxide-based material is selected from the group consisting of $Ce_{1-a}Zr_bO_{2-\delta 1}$ and $Ce_{1-c-d}Zr_cLan_dO_{2-\delta 2}$ wherein
   $0 < a < 1$;
   Lan is at least one rare earth selected from the group consisting of Y, La, Pr, Nd, Sm, Eu, and Yb;
   $c > 0.15$;
   $0.15 > d > 0.01$;
   and
   δ1 and δ2 are oxygen deficiencies.

63. The method of claim 62, wherein the cerium oxide-based material is selected from the group consisting of $Ce_{0.68}Zr_{0.32}O_2$ and $Ce_{0.24}Zr_{0.67}La_{0.09}O_2$.

64. The method of claim 60, wherein the washcoat comprises gamma-alumina, $Ce_{0.24}Zr_{0.67}La_{0.09}O_2$, SrO, and $Ln_2O_3$.

65. The method of claim 51, wherein the multi-phase catalyst comprises a perovskite phase and a non-perovskite phase.

66. The method of claim 65, wherein the perovskite phase is represented by a general formula of $Ln_{1-x}A_xMO_3$.

67. The method of claim 66, wherein the non-perovskite phase is an alkaline earth metal oxide represented by a formula of AO.

68. The method of claim 65, wherein the perovskite phase has a cation formula selected from the group consisting of $Ln_{0.8}Sr_{0.2}Mn_{0.88}Pd_{0.12}$, $Ln_{0.8}Sr_{0.2}Mn_{0.94}Pd_{0.06}$, $Ln_{0.60}Sr_{0.40}Mn_{0.95}Pd_{0.05}$, $Ln_{0.64}Sr_{0.36}Mn_{0.72}Pd_{0.28}$, and $Ln_{0.80}Sr_{0.20}Mn_{0.65}Pd_{0.35}$.

69. The method of claim 65, wherein the non-perovskite phase is selected from the group consisting of cerium oxide, an alkaline earth metal oxide represented by a formula of AO, an alkali metal oxide represented by the formula $A_2O$, an alkaline earth metal carbonate, and combinations thereof.

70. The method of claim 69, wherein the non-perovskite phase is cerium oxide.

71. The method of claim 69, wherein the alkaline earth metal oxide is SrO.

72. The method of claim 69, wherein the non-perovskite phase comprises a first non-perovskite phase of cerium oxide, and a second non-perovskite phase of SrO.

73. The method of claim 51, further comprising forming a layer on said catalyst composition, wherein said layer comprises as a non-precious metal component a cerium oxide-based material having a formula:

$Ce_{1-c-d}Zr_cLan_dO_{2-\delta2}$, where:

Lan is at least one of Y, La, Pr, Nd, Sm, Eu, Gd, Ho, or Yb; c>0.15; 0.15>d>0.01; and δ2 is an oxygen deficiency, where the cerium oxide-based material has a fluorite crystal structure.

74. The method of claim 73, wherein said layer is an overlayer.

75. The method of claim 73, wherein said layer further comprises at least one precious metal component selected from the group consisting of palladium, platinum, and rhodium.

76. The method of claim 75, wherein said layer further comprises alumina as a non-precious metal component.

77. The method of claim 76, wherein a weight ratio of said alumina to said cerium oxide-based material is between approximately 0.1:1 and approximately 1:0.4.

78. The method of claim 76, wherein said precious metal component is introduced into said layer by impregnating a solution of at least water-soluble salt of said at least one precious metal component into at least one non-precious metal component of said layer.

79. The method of claim 78, wherein said at least one water-soluble salt is selected from the group consisting of platinum nitrate and rhodium nitrate.

80. The method of claim 78, wherein said at least one water-soluble salt is selected from the group consisting of platinum nitrate and rhodium chloride.

81. The method of claim 73, wherein said layer further comprises at least one precious metal component selected from the group consisting of platinum and rhodium.

82. The method of claim 81, wherein a weight ratio of a platinum precious metal component to a rhodium precious metal component in said layer is between about 0.3:1 and about 3:1.

83. The method of claim 81, wherein a weight ratio of a platinum precious metal component to a rhodium precious metal component in said layer is about 1:1.

84. The method of claim 81, wherein a loading of said platinum precious metal component on said catalyst composition is between about 1 g/ft³ and about 10 g/ft³ and a loading of said rhodium precious metal component in said catalyst composition is between about 2 g/ft³ and about 8 g/ft³.

85. The method of claim 73, wherein a loading of said layer in the catalyst composition is between about 20 g/liter and about 130 g/liter.

86. A method for simultaneous conversion of oxides of nitrogen, carbon monoxide, and hydrocarbons in motor vehicle exhaust comprising:

(a) providing a catalyst composition, wherein said catalyst composition comprises:
    (i) a substrate;
    (ii) a washcoat; and
    (iii) a multi-phase catalyst represented by the general formula:

$Ce_yLn_{1-x}A_{x+s}MO_z$, wherein:

Ln is a mixture of elements originally in the form of single-phase mixed lanthanides collected from natural ores, a single lanthanide, or a mixture of artificial lanthanides;

A is an element selected from the group consisting of Mg, Ca, Sr, Ba, Li, Na, K, Cs, Rb, and combinations thereof;

M is an element selected from the group consisting of Fe, Mn, Cr, Ni, Co, Cu, V, Zr, Pt, Pd, Rh, Ru, Ag, Au, Al, Ga, Mo, W, Ti, and combinations thereof;

x is a number defined by $0 \leq x < 1.0$;

y is a number defined by $0 \leq y < 10$;

s is a number defined by $0 \leq s < 10$; and z is a number defined by z>0, where s=0 only when y>0 and y=0 only when s>0; and (b) contacting said exhaust with said catalyst composition.

87. The method of claim 86, wherein said contacting is at a temperature of at least 150° Centigrade and at approximately one atmosphere pressure.

88. The method of claim 86, wherein said catalyst composition further comprises a layer comprising a cerium oxide-based material having a formula:

$Ce_{1-c-d}Zr_cLan_dO_{2-\delta2}$, where:

Lan is at least one of Y, La, Pr, Nd, Sm, Eu, Gd, Ho, or Yb; c>0.15; 0.15>d>0.01; and δ2 is an oxygen deficiency, where the cerium oxide-based material has a fluorite crystal structure.

89. The method of claim 88, wherein said layer is an overlayer.

90. The method of claim 88, wherein said layer further comprises at least one precious metal component selected from the group consisting of palladium, platinum, and rhodium.

* * * * *